(12) United States Patent
Fujita et al.

(10) Patent No.: US 6,232,689 B1
(45) Date of Patent: *May 15, 2001

(54) ENERGY EXTRACTING MECHANISM HAVING A MAGNETIC SPRING

(75) Inventors: Etsunori Fujita, Hatsukaichi; Yoshimi Enoki, Aki-gun; Hiroshi Nakahira, Hiroshima; Seiji Kawasaki, Higashihiroshima, all of (JP)

(73) Assignee: Delta Tooling Co., Ltd., Hiroshima (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,088

(22) Filed: Mar. 30, 1998

(30) Foreign Application Priority Data

May 16, 1997 (JP) ............................................. 9-127557

(51) Int. Cl.[7] ............................................................ H02K 7/06
(52) U.S. Cl. .................................................. 310/103; 310/80
(58) Field of Search ......................................... 310/152, 156, 310/12, 80, 103, 23, 24, 35, 34, 46

(56) References Cited

U.S. PATENT DOCUMENTS

| 1,724,446 | * | 8/1929 | Worthington | 310/80 |
|---|---|---|---|---|
| 2,790,095 | * | 4/1957 | Peek et al. | 310/80 |
| 3,088,062 | | 4/1963 | Hudimac . | |
| 3,609,425 | | 9/1971 | Sheridan . | |
| 3,638,963 | | 2/1972 | Van Leeuwen . | |
| 3,770,290 | | 11/1973 | Bottalico . | |
| 3,842,753 | | 10/1974 | Theodore et al. . | |
| 3,879,622 | * | 4/1975 | Ecklin | 310/80 |
| 3,895,245 | * | 7/1975 | Bode | 310/46 |
| 3,899,703 | * | 8/1975 | Kinnison | 310/103 |
| 3,935,487 | * | 1/1976 | Czerniak | 310/46 |
| 3,941,402 | | 3/1976 | Yankowski et al. . | |
| 3,952,979 | | 4/1976 | Hansen . | |
| 3,967,146 | * | 6/1976 | Howard | 310/80 |
| 3,992,132 | * | 11/1976 | Putt | 417/271 |
| 4,011,477 | * | 3/1977 | Scholin | 310/80 |
| 4,189,699 | | 2/1980 | Burke, Jr. . | |
| 4,196,365 | * | 4/1980 | Presley | 310/23 |
| 4,207,773 | * | 6/1980 | Stahovic | 74/25 |
| 4,300,067 | * | 11/1981 | Schumann | 310/80 |

(List continued on next page.)

FOREIGN PATENT DOCUMENTS

| 3117377 | * | 12/1982 | (DE) . |
|---|---|---|---|
| 36 01 182 | | 7/1987 | (DE) . |
| 0 393 492 | | 10/1990 | (EP) . |
| 2 006 958 | | 5/1979 | (GB) . |
| 2222915 | * | 3/1990 | (GB) . |
| 2 296 068 | | 6/1996 | (GB) . |
| 58-89077 | * | 5/1983 | (JP) . |
| 61-231871 | * | 3/1985 | (JP) . |
| 63-149446 | | 6/1988 | (JP) . |
| 1-16252 | * | 1/1989 | (JP) . |
| 434246 | | 2/1992 | (JP) . |
| 7217687 | | 8/1995 | (JP) . |
| 97/38242 | * | 10/1997 | (WO) . |

*Primary Examiner*—Tran Nguyen
(74) *Attorney, Agent, or Firm*—Wenderoth, Lind & Ponack, L.L.P.

(57) ABSTRACT

An energy converting mechanism includes at least two permanent magnets spaced from each other with the same magnetic poles opposed to each other, and a magnetic spring formed by the at least two permanent magnets. The magnetic spring provides negative damping characteristics or changes static magnetic energy by changing an opposing area of the at least two permanent magnets so that an output is extracted from one of the at least two permanent magnets by applying an input to the other.

4 Claims, 24 Drawing Sheets

U.S. PATENT DOCUMENTS

| | | |
|---|---|---|
| 4,371,798 * | 2/1983 | Kuroda .................................. 310/80 |
| 4,432,441 | 2/1984 | Kurokawa . |
| 4,498,038 | 2/1985 | Malueg . |
| 4,502,652 | 3/1985 | Breitbach . |
| 4,583,752 | 4/1986 | Breitbach . |
| 4,595,166 | 6/1986 | Kurokawa . |
| 4,605,194 | 8/1986 | Binnig et al. . |
| 4,664,352 | 5/1987 | Shibuki et al. . |
| 4,710,656 | 12/1987 | Studer . |
| 4,802,660 | 2/1989 | Engdahl . |
| 4,913,482 | 4/1990 | Hanai et al. . |
| 4,950,931 | 8/1990 | Goldenberg et al. . |
| 4,969,624 | 11/1990 | Ustelentsev et al. . |
| 5,017,819 | 5/1991 | Patt et al. . |
| 5,120,030 | 6/1992 | Lin et al. . |
| 5,231,336 | 7/1993 | Van Namen . |
| 5,415,140 | 5/1995 | Rigazzi . |
| 5,419,528 | 5/1995 | Carter et al. . |
| 5,467,720 | 11/1995 | Korenaga et al. . |
| 5,487,533 | 1/1996 | Kurita et al. . |
| 5,584,367 | 12/1996 | Berdut . |
| 5,587,615 | 12/1996 | Murray et al. . |
| 5,633,547 | 5/1997 | Coombs . |

\* cited by examiner

ATTRACTION

REPULSION

REPULSION

Fig.5
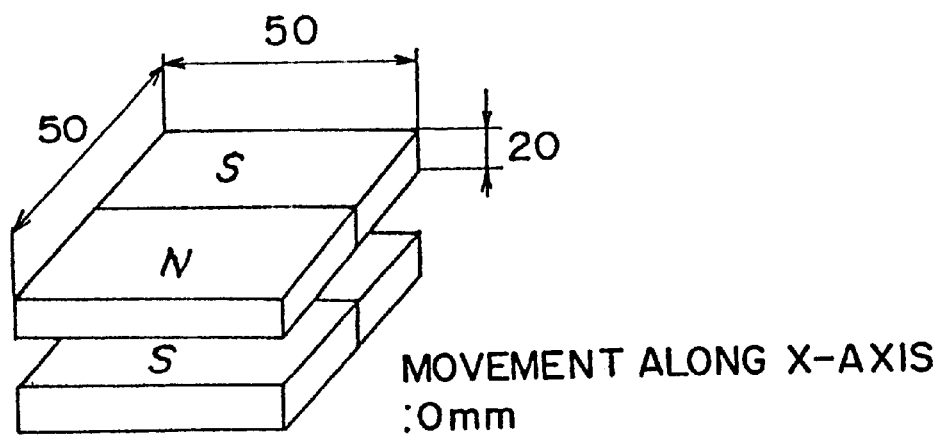
MOVEMENT ALONG X-AXIS
:0mm
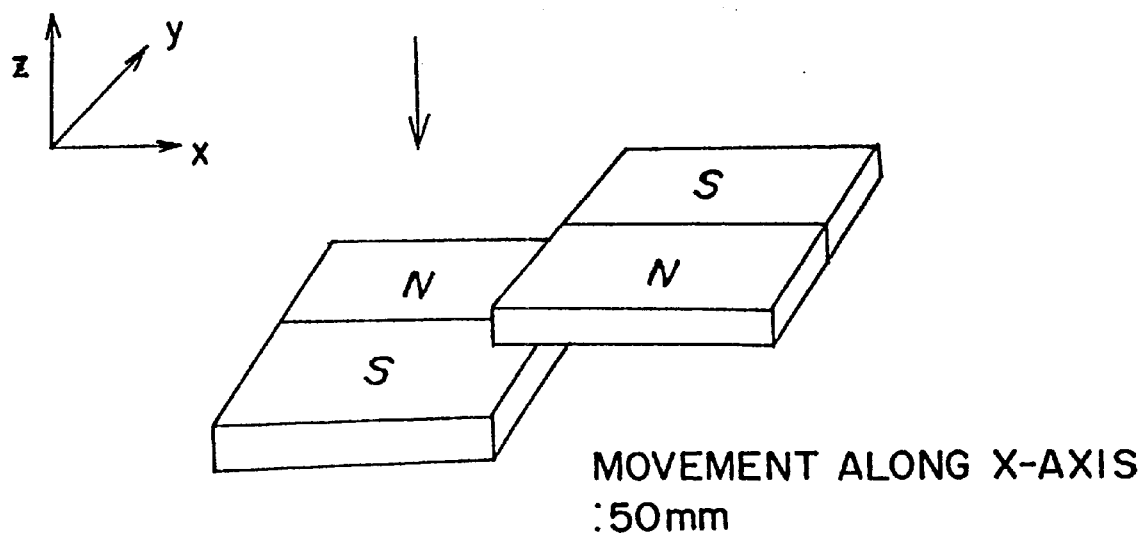
MOVEMENT ALONG X-AXIS
:50mm

ROTATIONAL ANGLE
:0°

ROTATIONAL ANGLE
:90°

ENERGY EXTRACTING MECHANISM HAVING A MAGNETIC SPRING

BACKGROUND OF THE INVENTION

1. Field of the Invention

The present invention relates generally to a magnetic spring having a plurality of permanent magnets and, in particular but not exclusively, to an energy extracting mechanism provided with a magnetic spring having negative damping characteristics by utilizing a repulsive force of a plurality of permanent magnets.

2. Description of Related Art

Various pressure mechanisms are widely used today. A press for performing pressure molding upon insertion of a workpiece between upper and lower bases is a typical example of the pressure mechanisms. The pressure mechanisms generally make use of water or oil pressures, a mechanical structure, or both of them.

An exciter or vibration generator is used to artificially generate vibration to investigate vibration characteristics of a structure. Exciters of an electromotive type and those employing an unbalance mass or a cam are known.

Because the conventional pressure mechanisms or exciters are generally of a complicated structure and are, hence, heavy and costly, light and inexpensive ones have been desired.

SUMMARY OF THE INVENTION

The present invention has been developed to overcome the above-described disadvantages.

It is accordingly an objective of the present invention to provide an energy extracting mechanism provided with a magnetic spring having negative damping characteristics in order to realize inexpensive pressure mechanisms or exciters of a simple construction by effectively utilizing potential energy existing in a magnetic field.

In accomplishing the above and other objectives, the energy extracting mechanism according to the present invention includes first and second permanent magnets spaced from each other with the same magnetic poles opposed to each other, and a magnetic spring formed by the first and second permanent magnets. The magnetic spring provides negative damping characteristics or changes static magnetic energy by changing an opposing area of said first and second permanent magnets so that an output may be extracted from said second permanent magnet by applying an input to said first permanent magnet, making it possible to simplify the construction of the energy extracting mechanism.

Advantageously, the first permanent magnet is rotated, while the second permanent magnet is caused to slide. By so doing, a press, an exciter or the like can be manufactured at a low cost.

The second permanent magnet can be rotated continuously by means of a force acting thereon for returning the second permanent magnet to a position where potential energy thereof is minimum, kinetic energy thereof, and an inertia moment thereof by applying a load to the first permanent magnet to impart potential energy thereto and by oscillating the first permanent magnet at a balanced position with the second permanent magnet. The continuous rotation of the second permanent magnet can derive electromagnetic induction and, hence, is applicable to a dynamo or the like.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 5 is a schematic diagram depicting mutually spaced permanent magnets with the same magnetic poles opposed to each other and also depicting the case where one of the permanent magnets is moved relative to the other (to change the opposing area thereof);

DETAILED DESCRIPTION OF THE PREFERRED EMBODIMENTS

Figure 1:
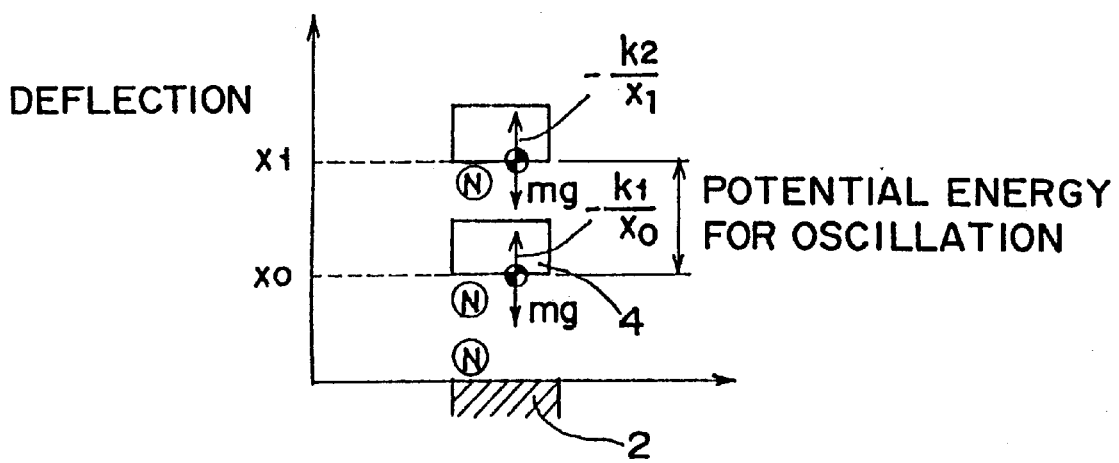
FIG. 1 is a schematic diagram of a magnetic spring according to the present invention, particularly depicting balanced positions of two permanent magnets on the input side and on the output side.

This application is based on applications Nos. 8-259810 and 9-127557 filed Sep. 30, 1996 and May 16, 1997, respectively, in Japan, the content of which is incorporated hereinto by reference.

Referring now to the drawings, preferred embodiments of the present invention are discussed hereinafter.

When a magnetic spring structure is made up of at least two spaced permanent magnets with the same magnetic poles opposed to each other, the two spaced permanent magnets are held in non-contact with each other. Furthermore, negative damping can be easily produced by changing the static magnetic field (the arrangement of the magnets) with a small amount of input utilizing the degree of freedom peculiar to the non-contact pair and the instability of the float control system.

The present invention has been developed taking note of this fact. At the time of input (go) and at the time of output (return), the geometric dimensions between the two permanent magnets are changed by a mechanism inside a kinetic system in which the permanent magnets are placed or by an external force. The change in geometric dimensions is converted into a repulsive force in the kinetic system to make the repulsive force from the balanced position of the two permanent magnets greater at the time of output than at the time of input.

The fundamental principle is explained hereinafter.

Figure 2:
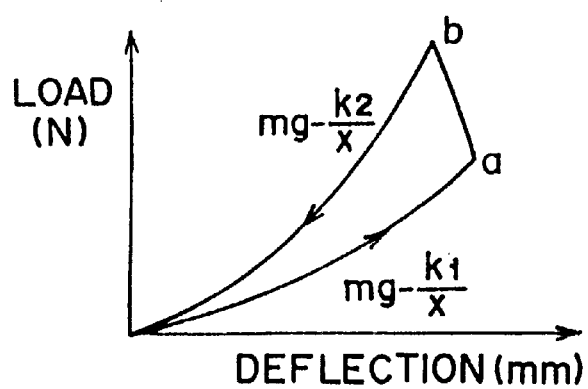
FIG. 2 is a graph of the fundamental characteristics of the magnetic spring of FIG. 1, particularly showing a relationship between the load applied to one of the two permanent magnets and the deflection thereof from the balanced position.

FIG. 1 schematically depicts balanced positions of two permanent magnets 2 and 4 on the input side and on the output side, while FIG. 2 depicts the fuundamental characteristics of the magnetic spring structure indicating a relationship between the load applied to one of the two permanent magnets and the deflection thereof from the balanced position.

As shown in FIG. 1, when the balanced position of the permanent magnet 4 on the input side relative to the permanent magnet 2 and the spring constant of the magnetic spring are $x_0$ and k1, respectively, and the balanced position thereof on the output side and the spring constant are $x_1$ and k2, respectively, an area conversion is performed between $x_0$ and $x_1$, and the following relations hold at respective balanced positions.

$$-k1/x_0 + mg = 0$$

$$-k2/x_1 + mg = 0$$

$$k2 > k1$$

Accordingly, the static characteristics indicate negative damping characteristics, as shown in FIG. 2, and it is conceivable that the potential difference between the position $x_1$ and the position $x_0$ corresponds to the potential energy for oscillation.

A model of FIG. 1 was made and a relationship between the load and the deflection was measured by changing the time during which the load was applied. As a result, a graph shown in FIG. 3 was obtained, which can be interpreted as meaning that when the two permanent magnets 2 and 4 approach their closest position, a great repulsive force is produced, and that when the amount of deflection from the balanced position changes slightly, a friction loss is produced by a damper effect of the magnetic spring, thus creating a damping term.

Figure 3:
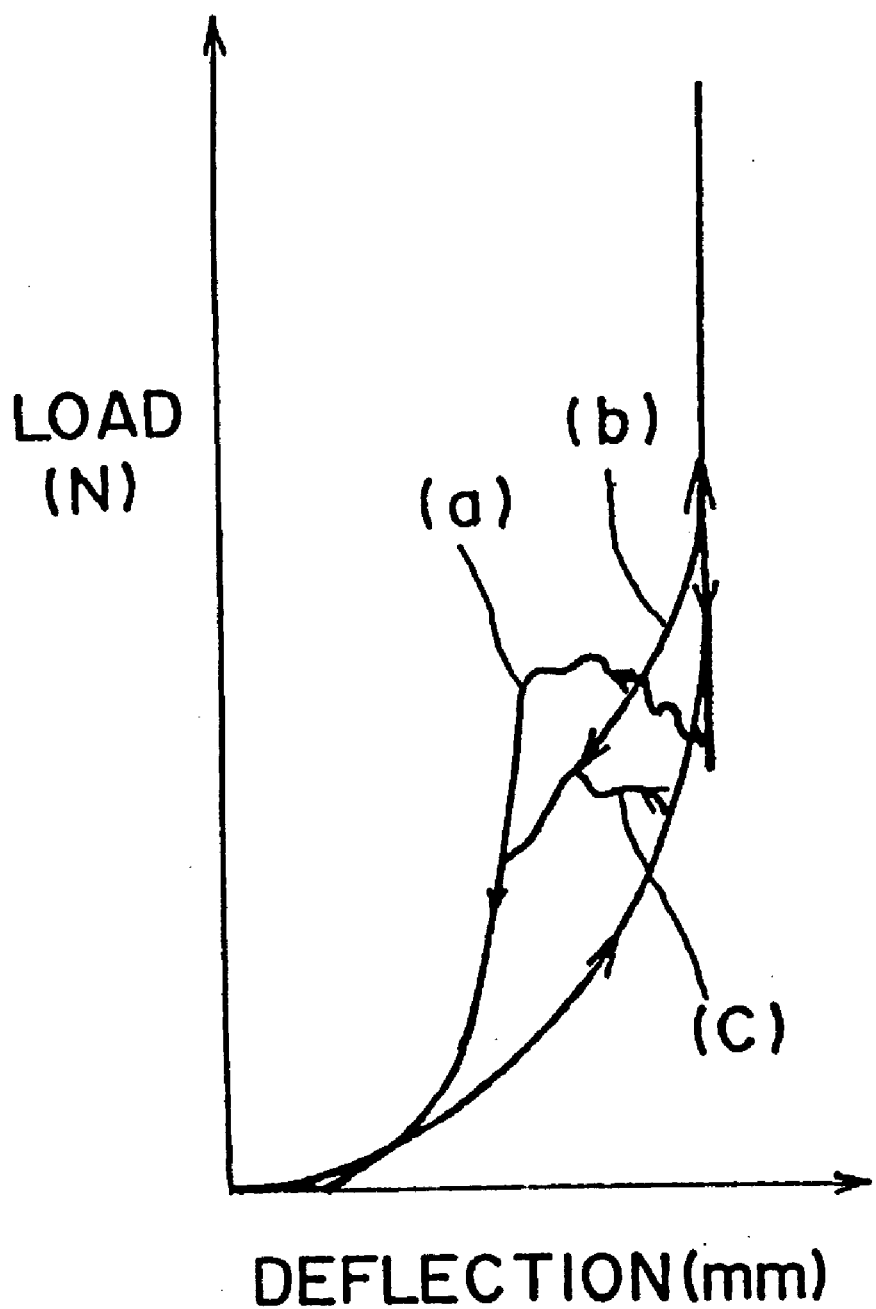
FIG. 3 is a graph showing a relationship between the load measured and the deflection.

In FIG. 3, (a) is a curve obtained when a constant load was applied, and the time during which the load was being applied becomes shorter in the order of (a), (b) and (c). In other words, the static characteristics vary according to the manner in which the load is applied, and the longer the time during which the load is applied, the greater the impulse.

As for rare-earth magnets, the strength of magnetization does not depend upon the magnetic field. More specifically, because the internal magnetic moment is not easily influenced by the magnetic field, the strength of magnetization on a demagnetization curve hardly changes, and the value is kept almost the same as that of saturation magnetization. Accordingly, in the case of rare-earth magnets, the force can be calculated using a charge model assuming that the magnetic load is uniformly distributed on its surfaces.

Figure 4A:
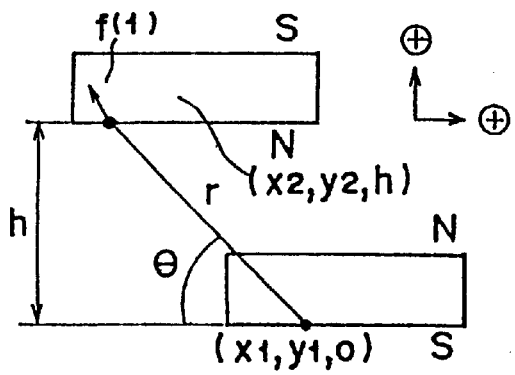
FIG. 4A is a schematic diagram depicting the way of thinking of input and output in a charge model assuming that magnetic charges are uniformly a distributed on end surfaces of the permanent magnets, and particularly showing attraction.
Figure 4B:
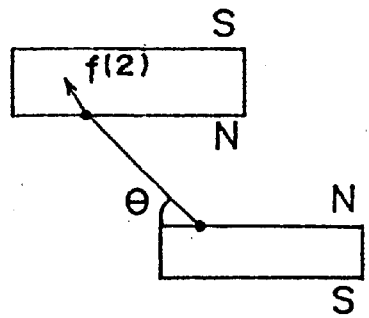
FIG. 4B is a diagram similar to FIG. 4A, but particularly showing repulsion.
Figure 4C:
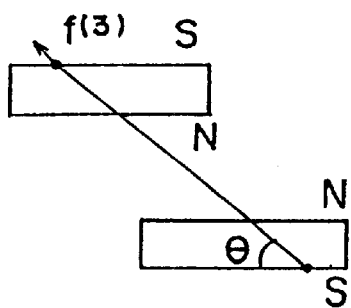
FIG. 4C is a diagram similar to FIG. 4A, but particularly showing repulsion at locations different from those shown in FIG. 4B.

FIG. 4 depicts the way of thinking in which a magnet is defined as a set of smallest unit magnets. The relationship of forces acting among the unit magnets was calculated by classifying it into three.

(a) Attraction (because the unit magnets are identical in both r and m, two types are defined by one)

$$f^{(1)} = (m^2 r^2) dx_1 dy_1 dx_2 cy_2$$

$$f_x^{(1)} = f^{(1)} \cos \theta$$

$$f_z^{(1)} = f^{(1)} \sin \theta$$

(b) Repulsion $$f_x^{(2)} = f^{(2)} \cos \theta$$

$$f_z^{(2)} = f^{(2)} \sin \theta$$

(c) Repulsion $$f_x^{(3)} = f^{(3)} \cos \theta$$

$$f_z^{(3)} = f^{(3)} \sin \theta$$

Accordingly, $$-f_x = 2f_x^{(1)} - f_x^{(2)} - f_x^{(3)}$$

$$-f_z = 2f_z^{(1)} - f_z^{(2)} - f_z^{(3)}$$

Hereupon, the Coulomb's law is expressed by:

| | |
|---|---|
| F = k(q$_1$q$_2$/r$^2$) | r: distance |
| q = MS | q1, q2: magnetic charge |
| | M(m): strength of magnetization |
| | S: area |

The forces can be obtained by integrating the above ($-f_x$) and ($-f_z$) with respect to the range of the magnet size.

Figure 6:
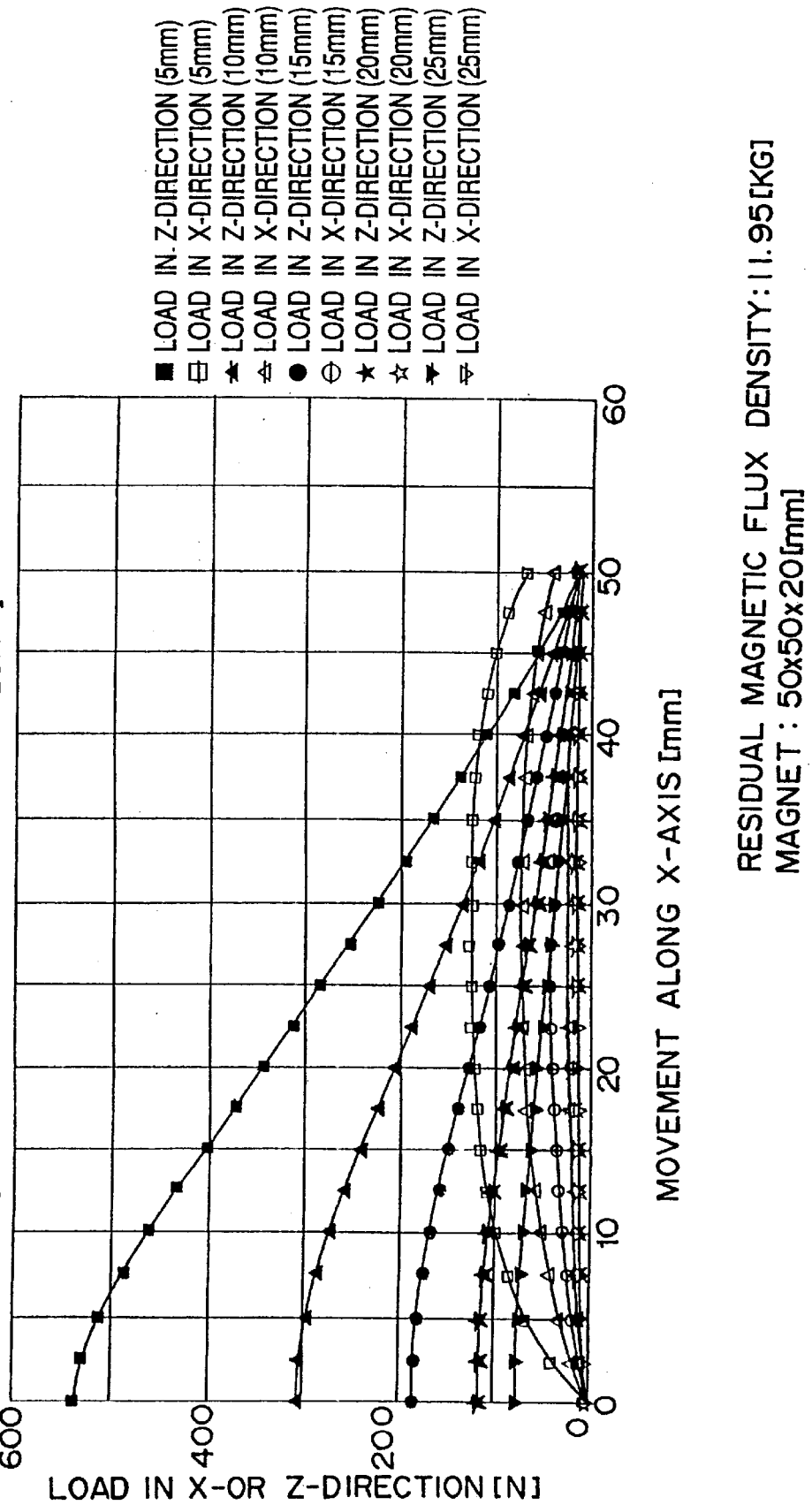
FIG. 6 is a graph showing the load in X-axis and Z-axis directions relative to the amount of movement in X-axis direction when calculation has been carried out based on FIG. 5.

As shown in FIG. 5, calculation was carried out for each magnetic gap by moving one of two opposing magnets relative to the other from the condition in which they are completely lapped (the length of movement x=0 mm) to the condition in which one of them is completely slipped (the length of movement x=50 mm). The results of calculation are shown in FIG. 6. Although the internal magnetic moment is defined as being constant, it is somewhat corrected because disorder is caused around the magnets when the magnetic gap is small.

The above results of calculation are generally in agreement with the results of actual measurement. The force required for moving the point (a) to the point (b) in FIG. 2 is the x-axis load, while the output is represented by the z-axis load. The relationship of input<output caused by instability is statically clarified.

Figure 7:
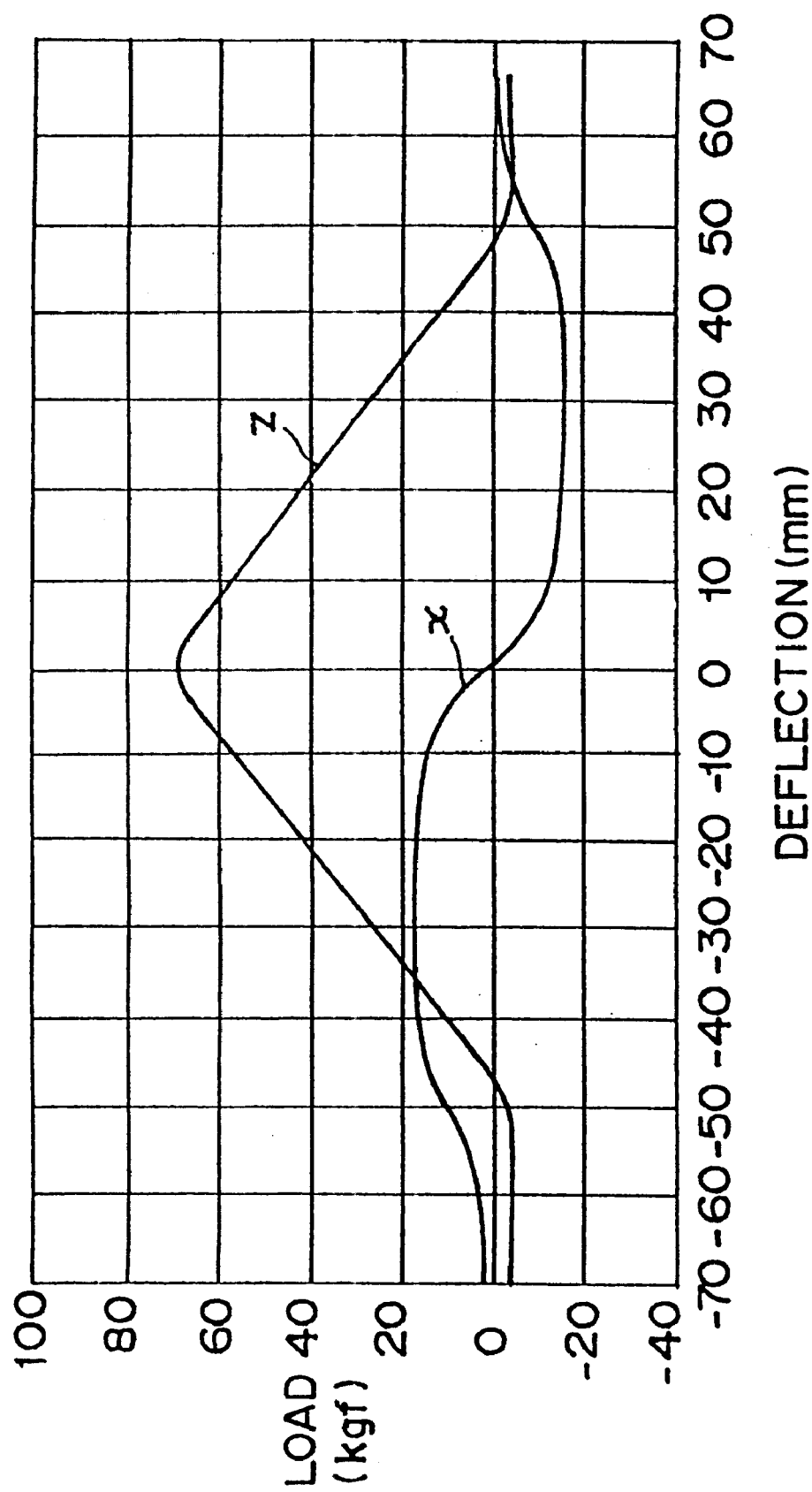
FIG. 7 is a graph showing a relationship between the load and deflection when the distance between the permanent magnets of FIG. 5 is kept constant, and one of the magnets is moved relative to the other from the completely slipped condition to the completely lapped one, and again to the completely slipped one.

FIG. 7 is a graph indicating a relationship between the x-axis load and the z-axis load when the distance between the magnets is kept 3 mm, and the condition of the magnets is changed from the completely slipped condition to the completely lapped one, and again to the completely slipped one. This graph is a characteristic curve indicating that the absolute value of the x-axis load is the same but the direction of output is reversed. When one of the magnets is moved relative to the other to approach the completely lapped condition, the former receives a resistance, resulting in damping. On the other hand, when one of the magnets is moved relative to the other from the completely lapped condition to the completely slipped condition, the former is accelerated. These characteristics can be used in a non-contact damper to reduce the vibration energy or to improve the transmissibility in the low, middle and high frequency region (0–50 Hz) which human beings can sense, though conventional dampers could not achieve this.

Figure 8:
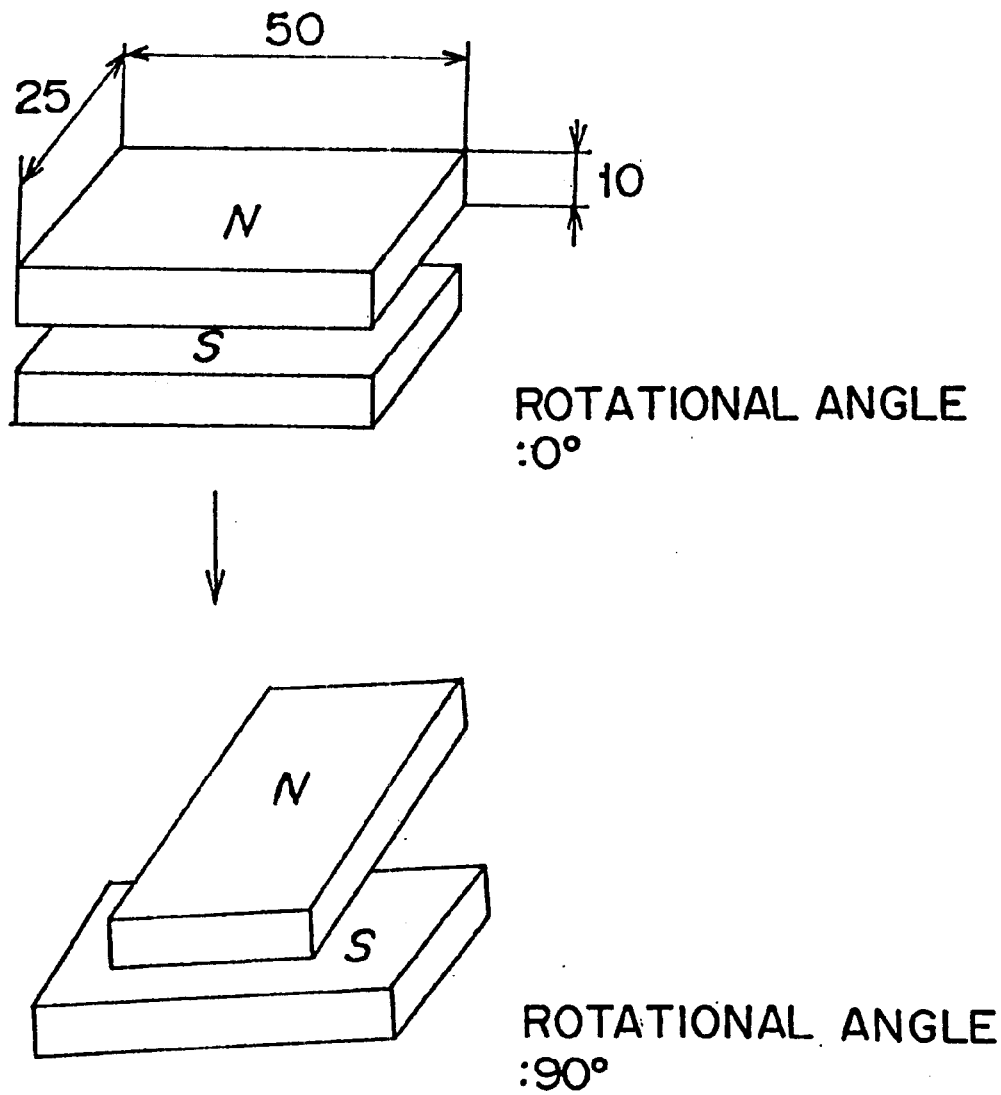
FIG. 8 is a schematic diagram depicting mutually spaced permanent magnets with the same magnetic poles opposed to each other and also depicting the case where one of the magnets is rotated relative to the other (to change the opposing area thereof)
Figure 9:
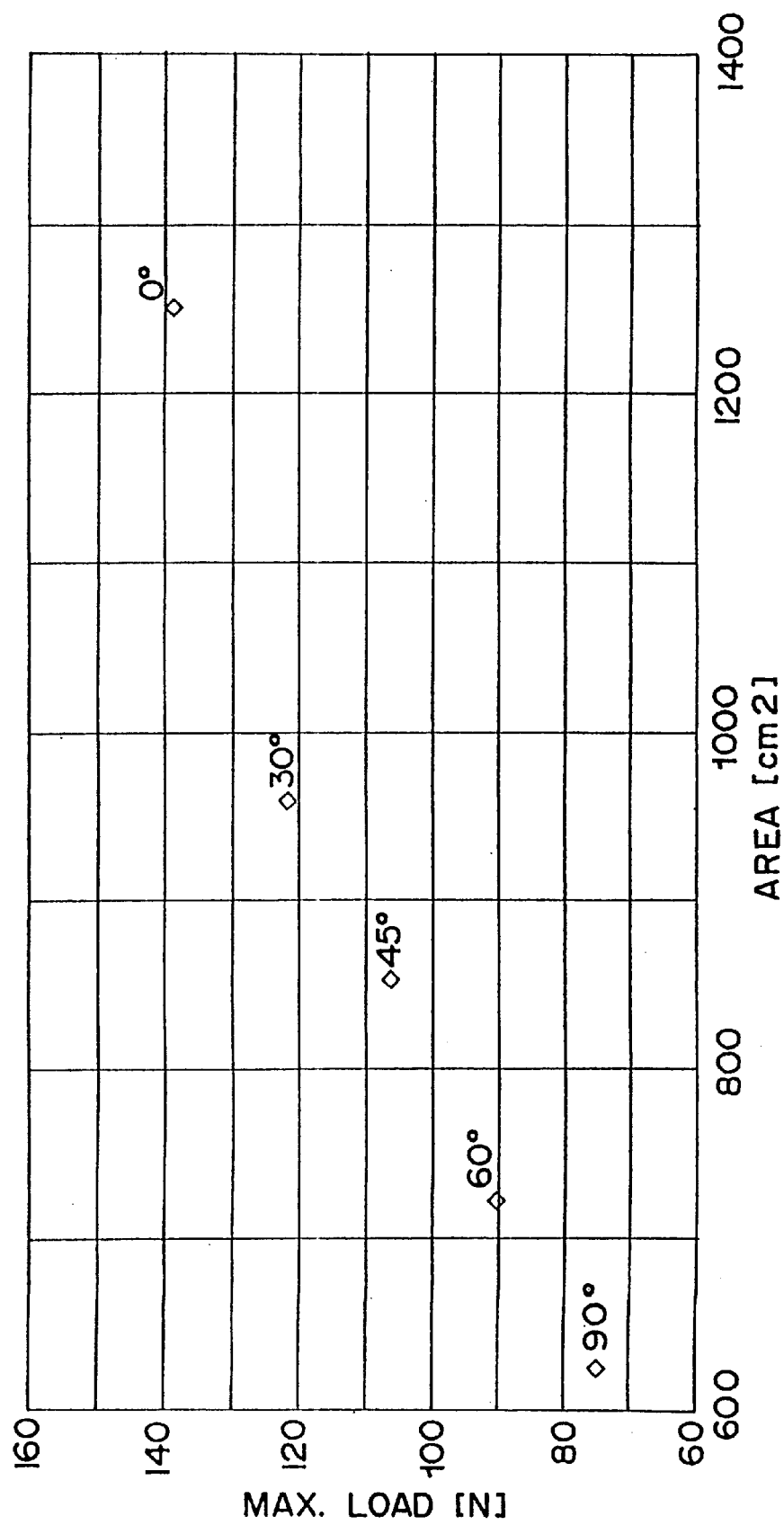
FIG. 9 is a graph showing the maximum load relative to the opposing area when one of the magnets is rotated, as shown in FIG. 8.

When the rotational angle of the opposing magnets is changed as shown in FIG. 8, a graph shown in FIG. 9 was obtained. As a matter of course, the maximum load decreases as the opposing area decreases. This graph indicates that the output can be changed through an area conversion which can be performed by applying a predetermined input.

Figure 10:
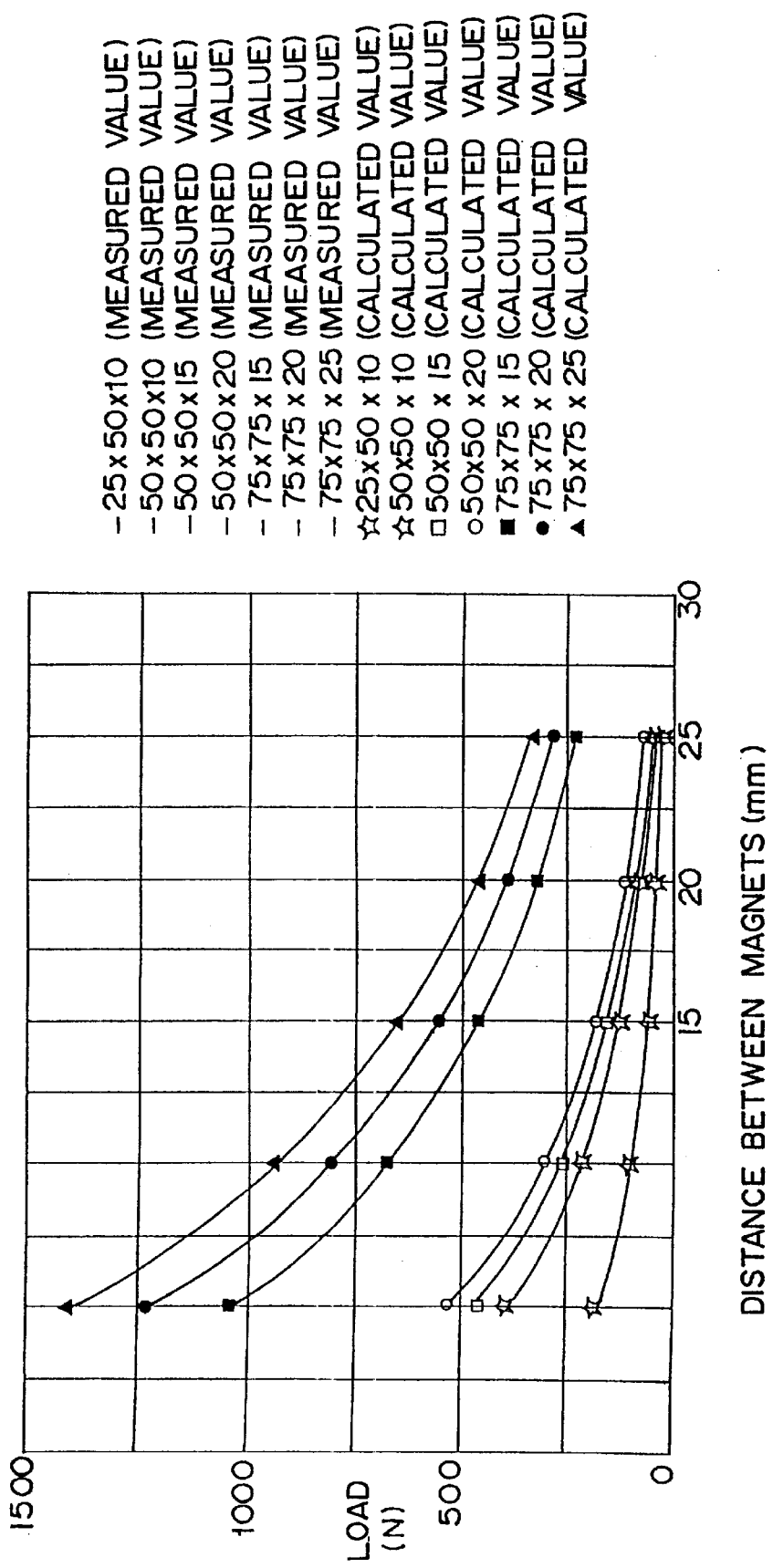
FIG. 10 is a graph showing a relationship between the load and the distance between the magnets when neodymium-based magnets are employed.

FIG. 10 is a graph indicating a relationship between the load and the distance between the magnets when neodymium-based magnets are employed.

The repulsive force increases with an increase in mass. The repulsive force F is given by:

$$f \alpha Br^2 \times (\text{geometric dimensions})$$

$Br$: strength of magnetization

The geometric dimensions mean the size determined by the distance between the opposing magnets, the opposing area, the magnetic flux density, the strength of the magnetic field or the like. If the magnet material is the same, the strength of magnetization (Br) is constant and, hence, the repulsive force of the magnets can be changed by changing the geometric dimensions.

Figure 11:
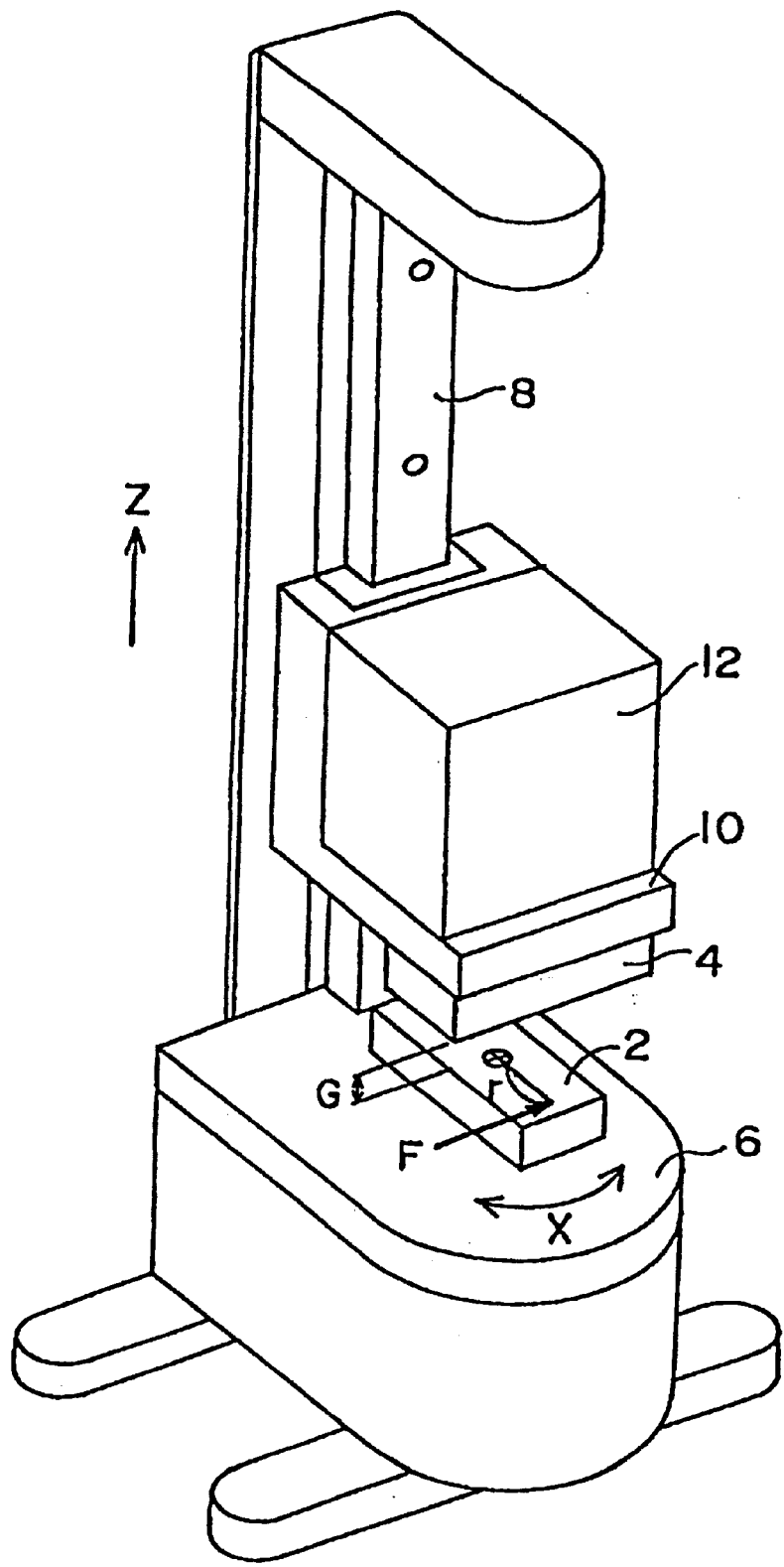
FIG. 11 is a perspective view of a rotary mechanism wherein geometric dimensions are changed by changing the opposing area of the permanent magnets.
Figure 12:
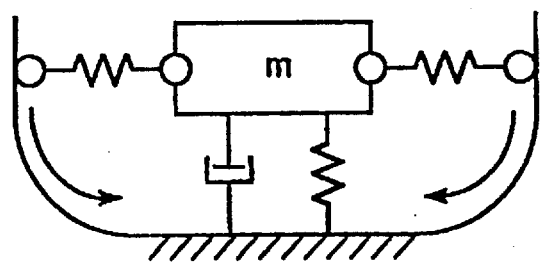
FIG. 12 is a schematic view of a mechanical model of the rotary mechanism of FIG. 11.

FIG. 11 depicts a rotary mechanism wherein the geometric dimensions are changed by rotating one of two permanent magnets 2, 4 relative to the other to change the opposing area thereof, while FIG. 12 depicts a mechanical model of the rotary mechanism of FIG. 11.

As shown in FIG. 11, the permanent magnet 2 is rotatably mounted on a base 6 to which a linear slider 8 is secured so as to extend vertically. An L-shaped member 10 is vertically slidably mounted on the linear slider 8. A weight 12 is placed on an upper surface of the L-shaped member 10, while the permanent magnet 4 is secured to a lower surface of the L-shaped member 10 so as to confront the permanent magnet 2 with the same magnetic poles opposed to each other.

In the rotary mechanism of the above-described construction, when permanent magnets of a size of 49 mmL×25 mmW×11 mmH (Trade name: NEOMAX-39SH) and a weight weighing 6.5 kg (total weight: about 7.33 kg including the L-shaped member 10 and the permanent magnet 4) were used for the permanent magnets 2, 4 and the weight 12, respectively, and when a torque was applied to the permanent magnet 2, the following results were obtained.

TABLE 1

| X | F | Z |
|---|---|---|
| 0° | 0 | 0 |
| 15° | 0.45 kgf | 1.18 mm |
| 30° | 0.56 kgf | 2.80 mm |
| 45° | 0.51 kgf | 4.52 mm |
| 60° | 0.40 kgf | 5.70 mm |
| 75° | 0.20 kgf | 6.37 mm |
| 90° | 0 | 6.65 mm |

Hereupon, X is the rotational angle measured from the condition of FIG. 11 in which the opposing area of the permanent magnets 2, 4 is minimum, F is the load applied to the permanent magnet 2 at a location apart a distance r from the center thereof in a direction longitudinally thereof, and Z is the deflection measured from the balanced position (G=7.5 mm) of the permanent magnets 2, 4.

Figure 13:
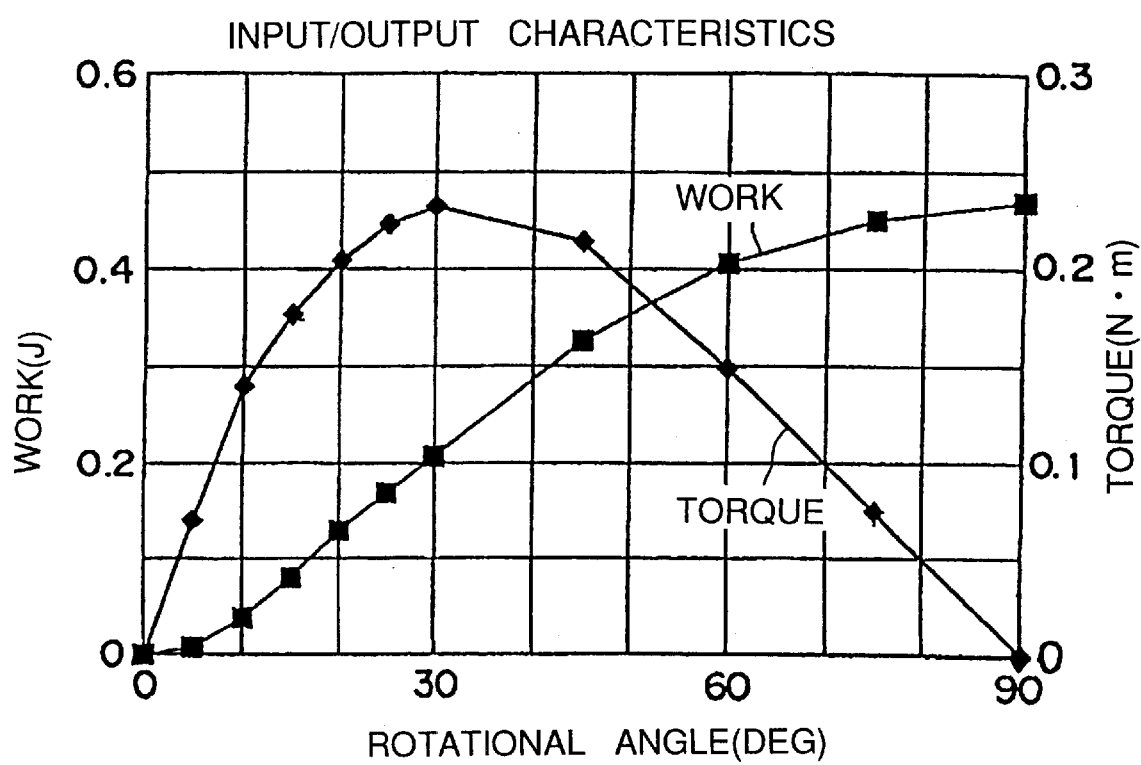
FIG. 13 is a graph showing a relationship between input torque and output work in the rotary mechanism of FIG. 11.
Figure 14:
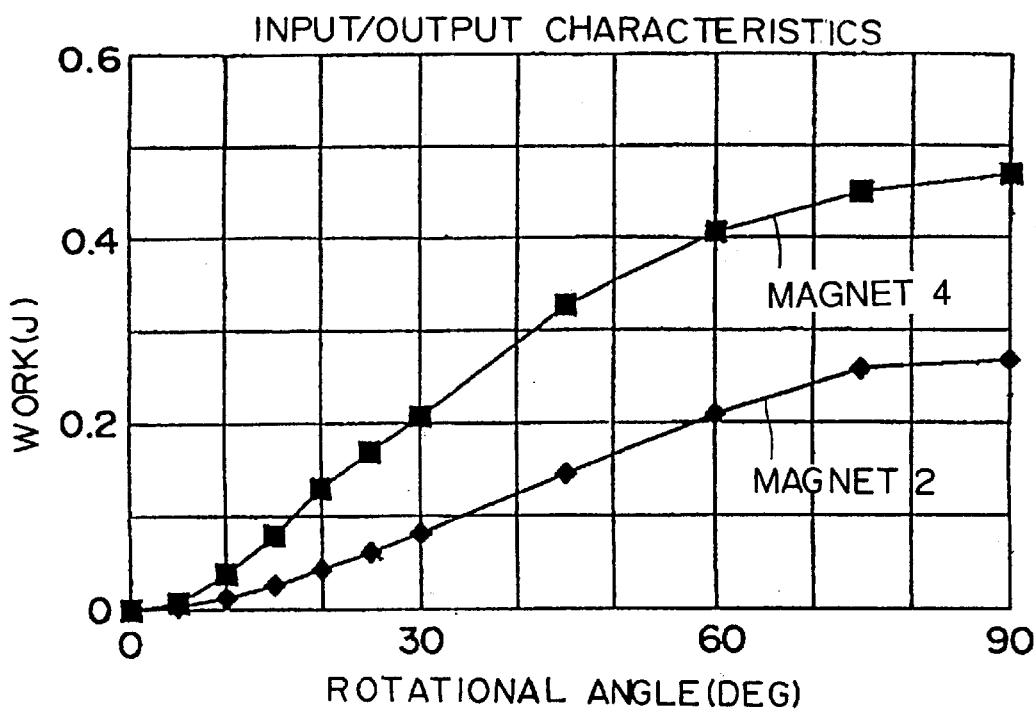
FIG. 14 is a graph showing a relationship between input work and output work in the rotary mechanism of FIG. 11.

FIGS. 13 and 14 depict input/output characteristics of the rotary mechanism referred to above.

As can be seen from these figures, when X=0°, F=0, and the torque to be inputted increases abruptly until X=30° and decreases gradually after the rotational angle exceeds X=30°. These figures also reveal that a great output work can be extracted from a relatively small input work by making use of negative damping characteristics of the magnetic spring or by changing the static magnetic energy. The input work and the output work can be derived from the following formulas.

Figure 15:
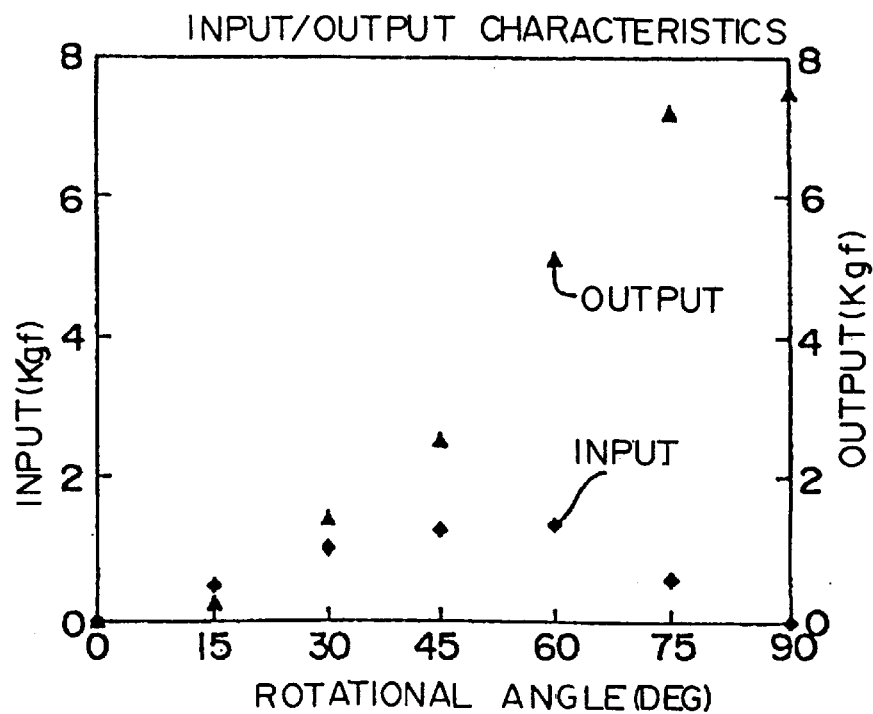
FIG. 15 is a graph showing a relationship between input load and output load in the rotary mechanism of FIG. 11.

$N(\text{torque}) = rF$ $P = mv$  $P$: momentum of permanent magnet 4, $F = dP/dt$ $L = m\theta L$: angular momentum of permanent magnet 2, $N = dL/dt$ $W(\text{output work}) = \int F dx = \int (dP/dt) dx = d/dt \int P dx$ $W(\text{input work}) = \int N d\theta = \int (dL/dt) d\theta = d/dt \int L d\theta$ FIG. 15 is a graph indicating a relationship between the input load and the output load when one of two permanent magnets of a 50 mmL×25 mmW×10 mmH size is rotated relative to the other by 0° (50% lapping) to 90° (100% lapping) with the same magnetic poles opposed to each other.

The graph of FIG. 15 reveals that a great output can be obtained from a relatively small input by the conversion of potential energy in a magnetic field. Accordingly, the rotary mechanism of FIG. 11 can be employed not only in a vertical exciter or vibration generator but also in a horizontal exciter by moving the weight 12 horizontally. If the weight 12 is used as a ram, the rotary mechanism of FIG. 11 can be employed in an upstroke press.

Figure 16:
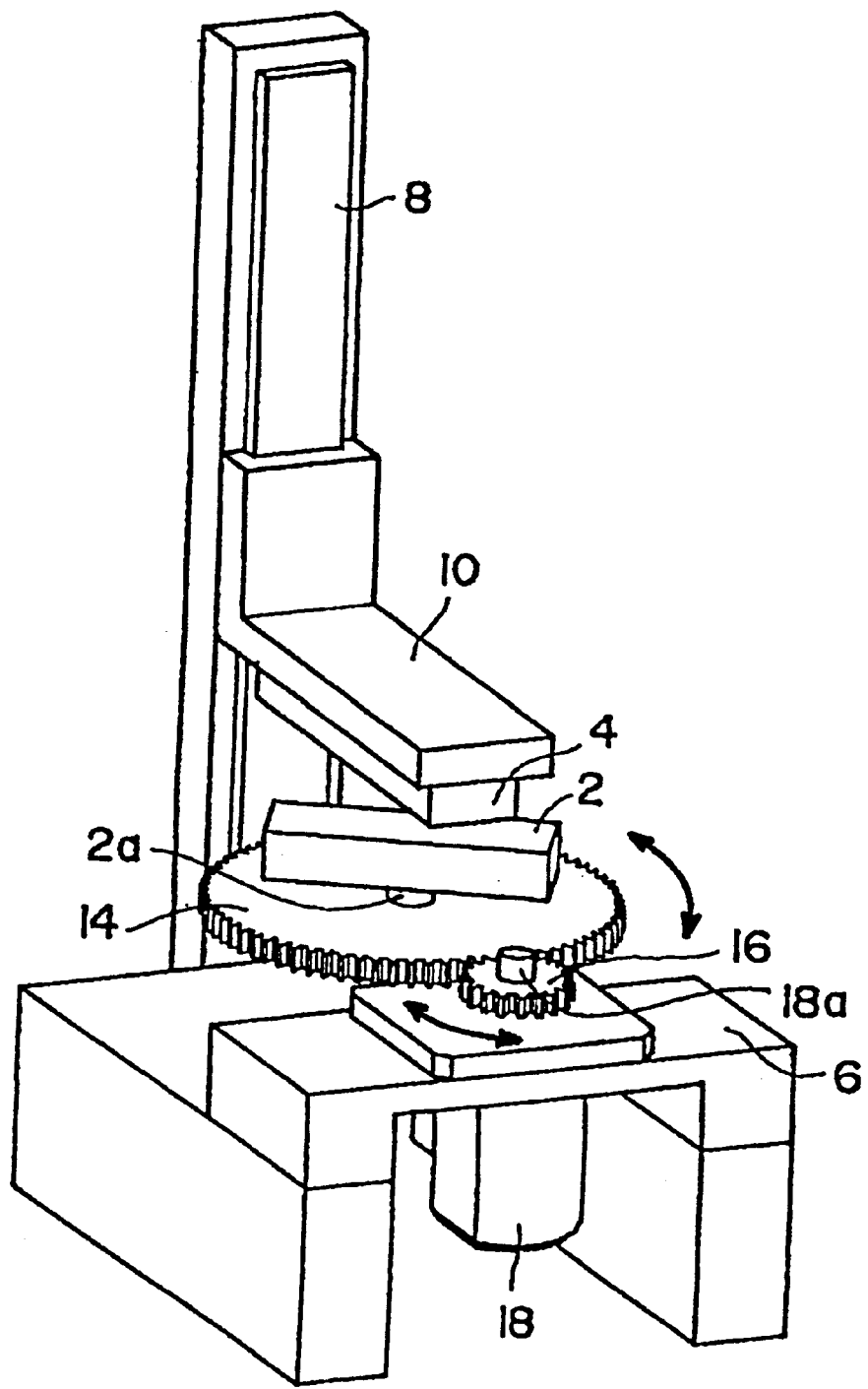
FIG. 16 is a perspective view of another rotary mechanism.

FIG. 16 depicts a rotary mechanism of a construction more concrete than that of FIG. 11.

As shown in FIG. 16, the permanent magnet 2 has a rotary shaft 2a rotatably mounted on the base 6. A large-diameter gear 14 is rigidly secured to the rotary shaft 2a for rotation together therewith, while a small-diameter gear 16 in mesh with the large-diameter gear 14 is rigidly secured to a rotary shaft 18a of a drive motor 18.

In this rotary mechanism, when the small-diameter gear 16 is rotated by means of a rotational force of the drive motor 18, the permanent magnet 2 together with the large-diameter gear 14 rotates at a speed smaller than that of the small-diameter gear 16. As a result, an area conversion is conducted between the two permanent magnets 2, 4, moving the permanent magnet 4 vertically along the near slider 8. Hereupon, it is sufficient if the drive motor 18 for rotating the mall-diameter gear 16 has a relatively small torque.

Figure 17:
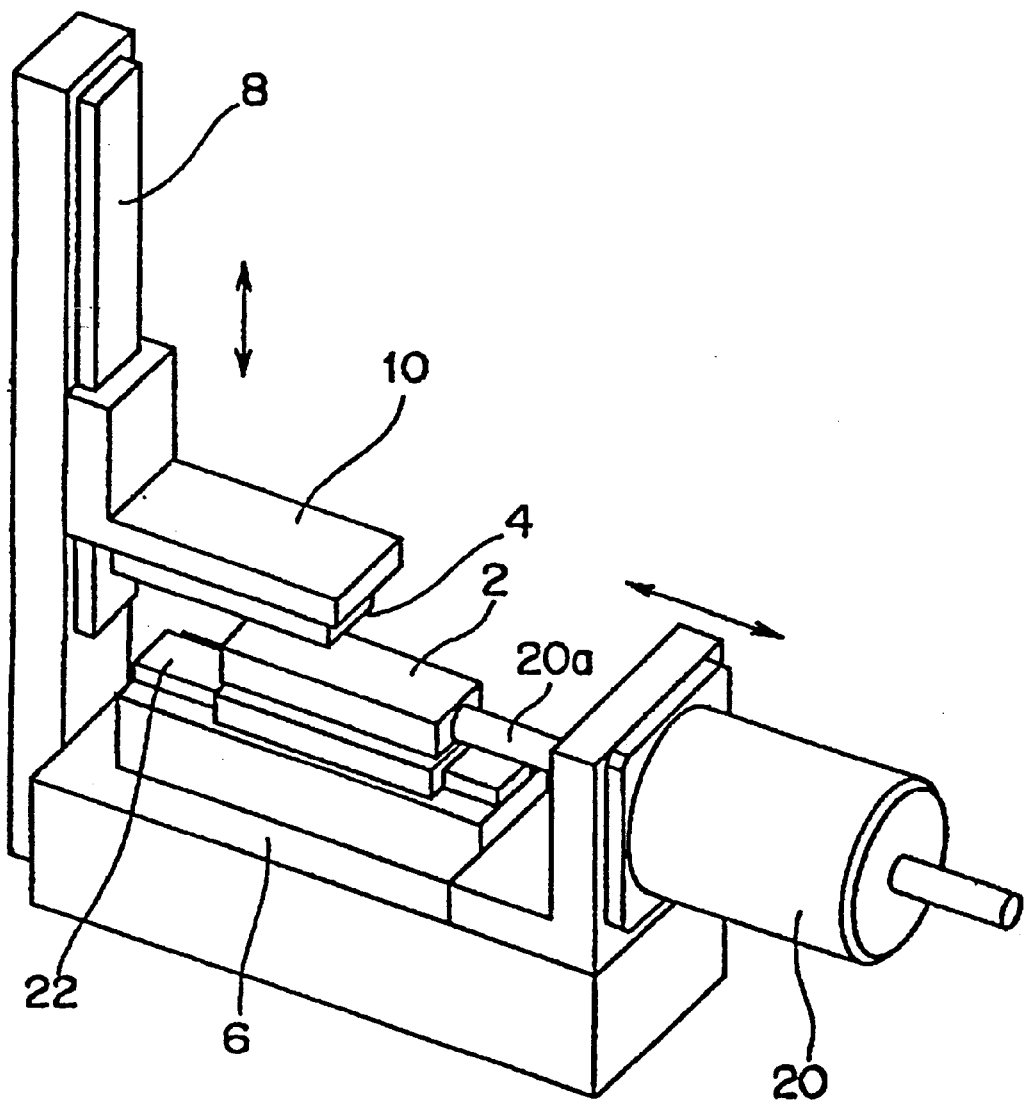
FIG. 17 is a perspective view of a reciprocating mechanism wherein the geometric dimensions are changed by changing the opposing area of the permanent magnets.

FIG. 17 depicts a reciprocating mechanism wherein an area conversion is conducted by sliding the permanent magnet 2 relative to the permanent magnet 4.

More specifically, the permanent magnet 2 is coupled to a drive shaft 20a of a drive source 20 such as, for example, a VCM (voice coil motor) and is slidably mounted on a linear slider 22 secured to the base 6. The permanent magnet 2 is caused to slide horizontally along the linear slider 22 by means of a drive force of the drive source 20. When the permanent magnet 2 slides, an area conversion is conducted between the two permanent magnets 2, 4 to thereby move the permanent magnet 2 vertically.

Furthermore, in the rotary mechanism of FIG. 11, when the permanent magnet 4 is on the input side, while the permanent magnet 2 is on the output side, a vertical movement can be converted into rotational energy. That is, when the permanent magnet 4 is coupled to a drive source via, for example, a cam mechanism and when an input of a predetermined frequency is applied to the cam mechanism, the permanent magnet 4 repeats a vertical oscillation, resulting in rotation of the permanent magnet 2. Accordingly, electromagnetic induction can be caused by rotating, for example, a coil together with the permanent magnet 2. More specifically, when potential energy is imparted to the permanent magnet 4 by applying a load thereto and when the permanent magnet 4 is oscillated with a small input at the balanced point thereof with the permanent magnet 2, the permanent magnet 2 is rotated continuously by means of a force acting thereon to return it to the position where the potential energy thereof is minimum, an inertial moment thereof, and kinetic energy thereof obtained by the oscillation of the potential energy of the weight 12. The aforementioned predetermined frequency depends on the strength of magnetic force, and the magnitude of input energy is inversely proportional to the magnitude of the load applied (weight 12). The permanent magnet 2 can be rotated at a high speed with a relatively small input by applying an oscillating input to the permanent magnet 4, making it possible to apply this mechanism to a dynamo or the like.

Figure 18:
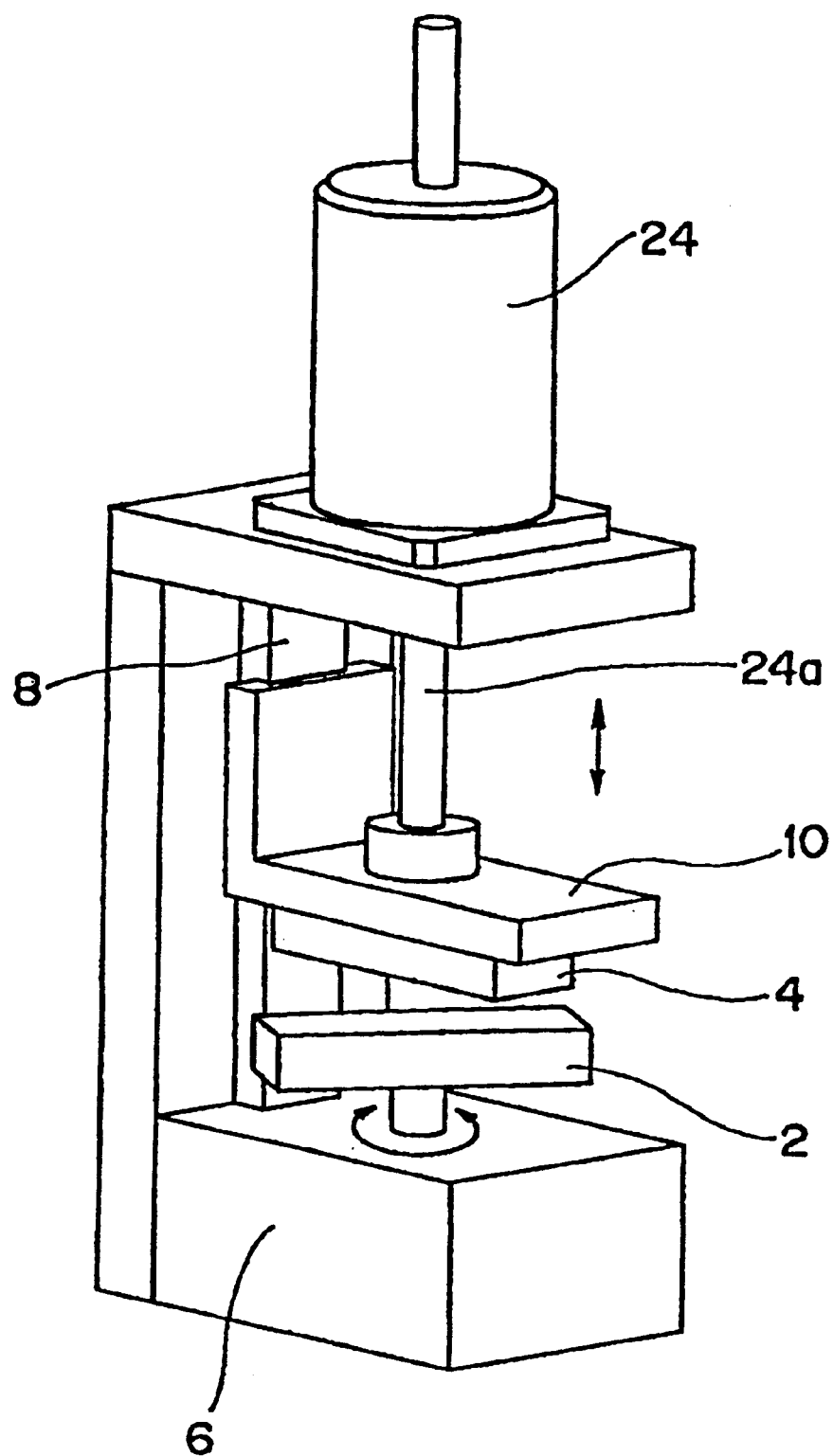
FIG. 18 is an energy extracting mechanism wherein rotational energy is extracted by rotating one of two permanent magnets.

FIG. 18 depicts a rotational-energy extracting mechanism wherein a permanent magnet 2 is rotatably mounted on a base 6 and an L-shaped member 10 having a permanent magnet 4 secured thereto is rigidly connected to a drive shaft 24a of a drive source 24 such as, for example, a VCM for rotation together therewith.

In the rotational-energy extracting mechanism as shown in FIG. 18, when the permanent magnet 4 together with the L-shaped member 10 is moved vertically along a linear slider 8 at a predetermined frequency by means of a drive force of the drive source 24, the permanent magnet 2 which confronts the permanent magnet 4 with the same magnetic poles opposed to each other rotates at a high speed, making it possible to extract rotational energy.

Figure 19:
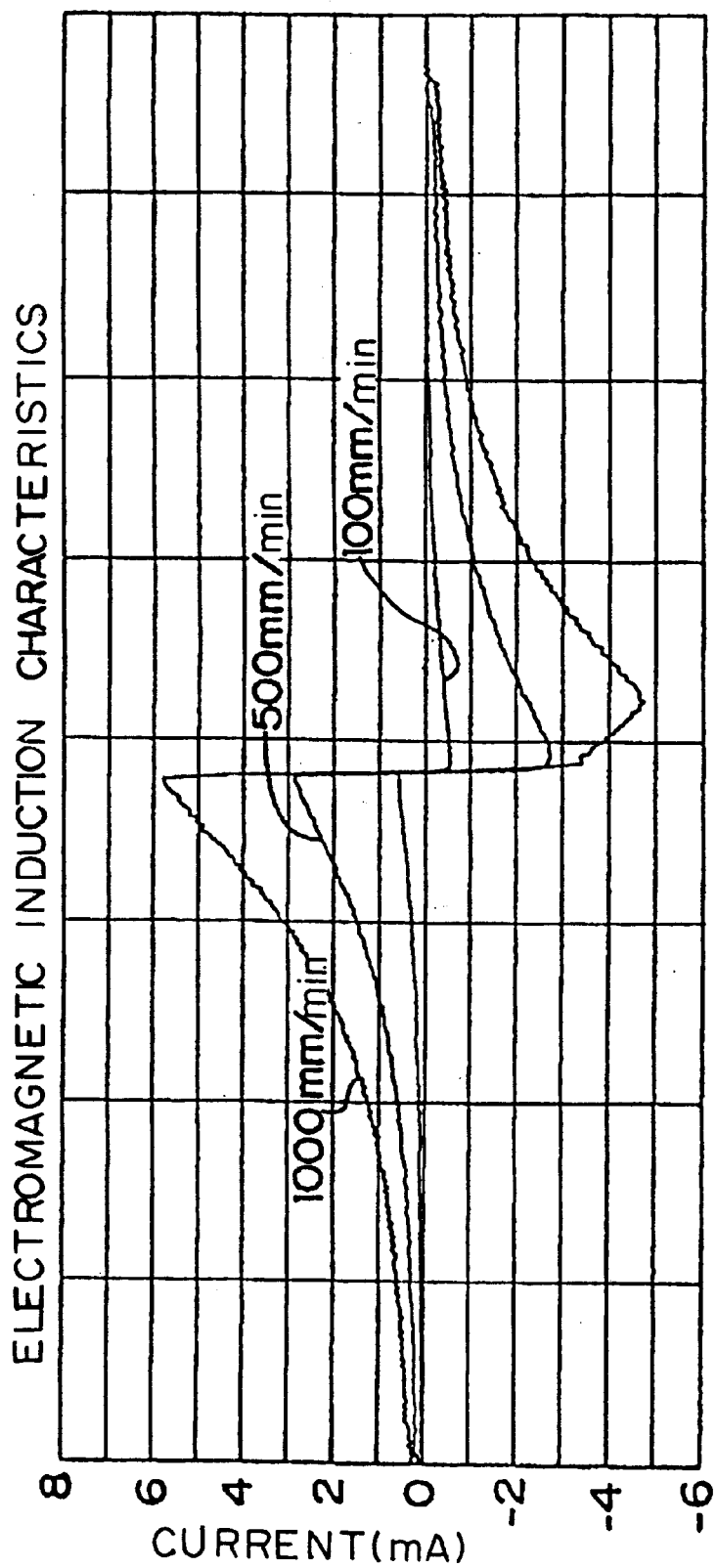
FIG. 19 is a graph showing electromagnetic induction characteristics when a coil is rotated together with one of the two permanent magnets.

Hereupon, electric current generated in a coil was investigated by rotating the coil together with the permanent magnet 2. Two permanent magnets of the same size as that used to obtain the graph of FIG. 15 were used for the permanent magnets 2, 4. FIG. 19 is a graph indicating the electric current generated in the coil. The coil used had 50 turns of a sectional area of 1 mm$^2$, and the speed of movement of the permanent magnet 4 was set to 100 mm/min., 500 mm/min., and 1000 mm/min.

This graph reveals that the current value increases substantially in proportion to the speed of movement of the permanent magnet 4 and that a desired output (current) can be obtained by appropriately setting the magnitude of an input.

Figure 20:
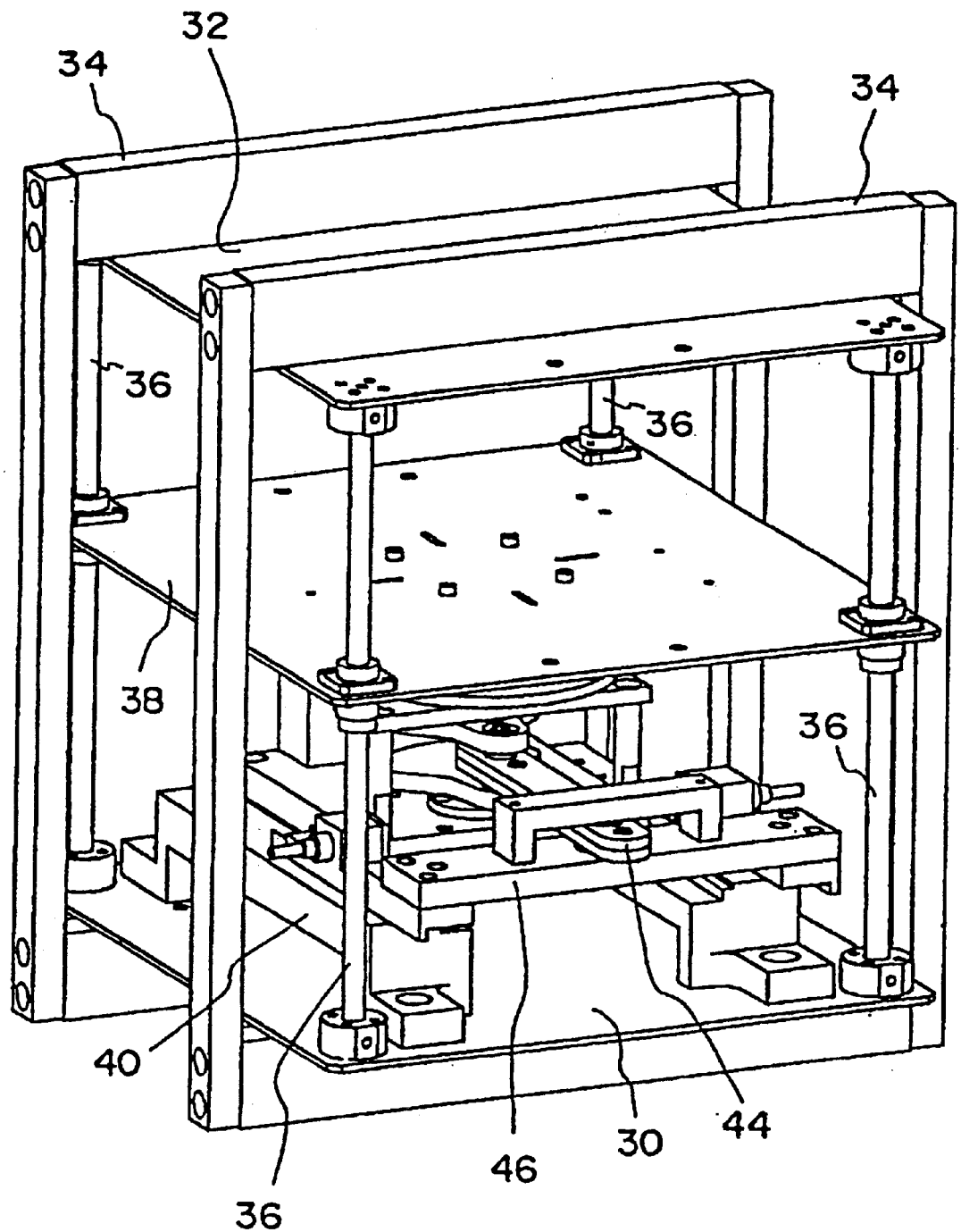
FIG. 20 is a perspective view of another energy extracting mechanism.
Figure 21:
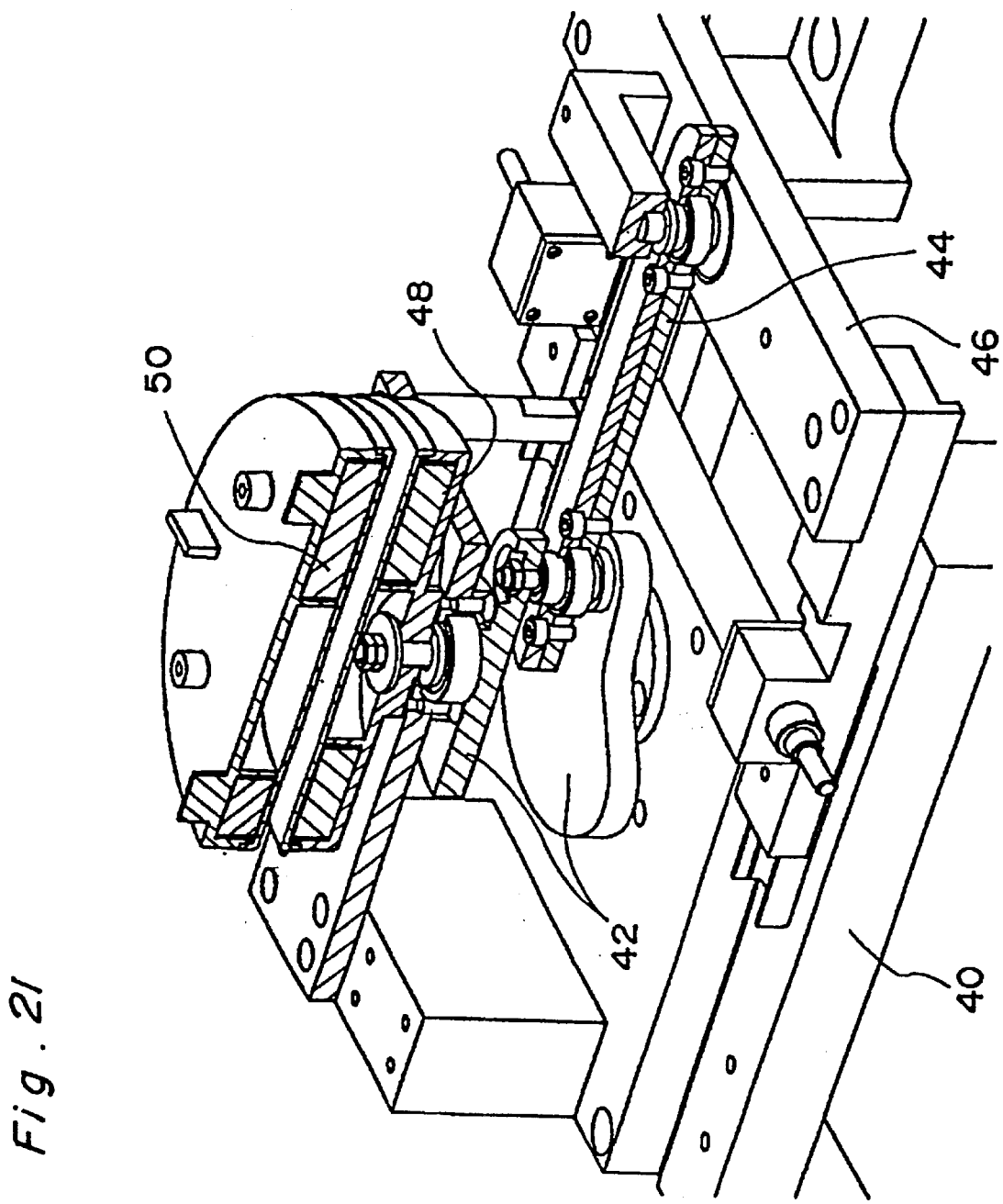
FIG. 21 is a fragmentary perspective view, partly in section, of a main portion of the energy extracting mechanism of FIG. 20.
Figure 22:
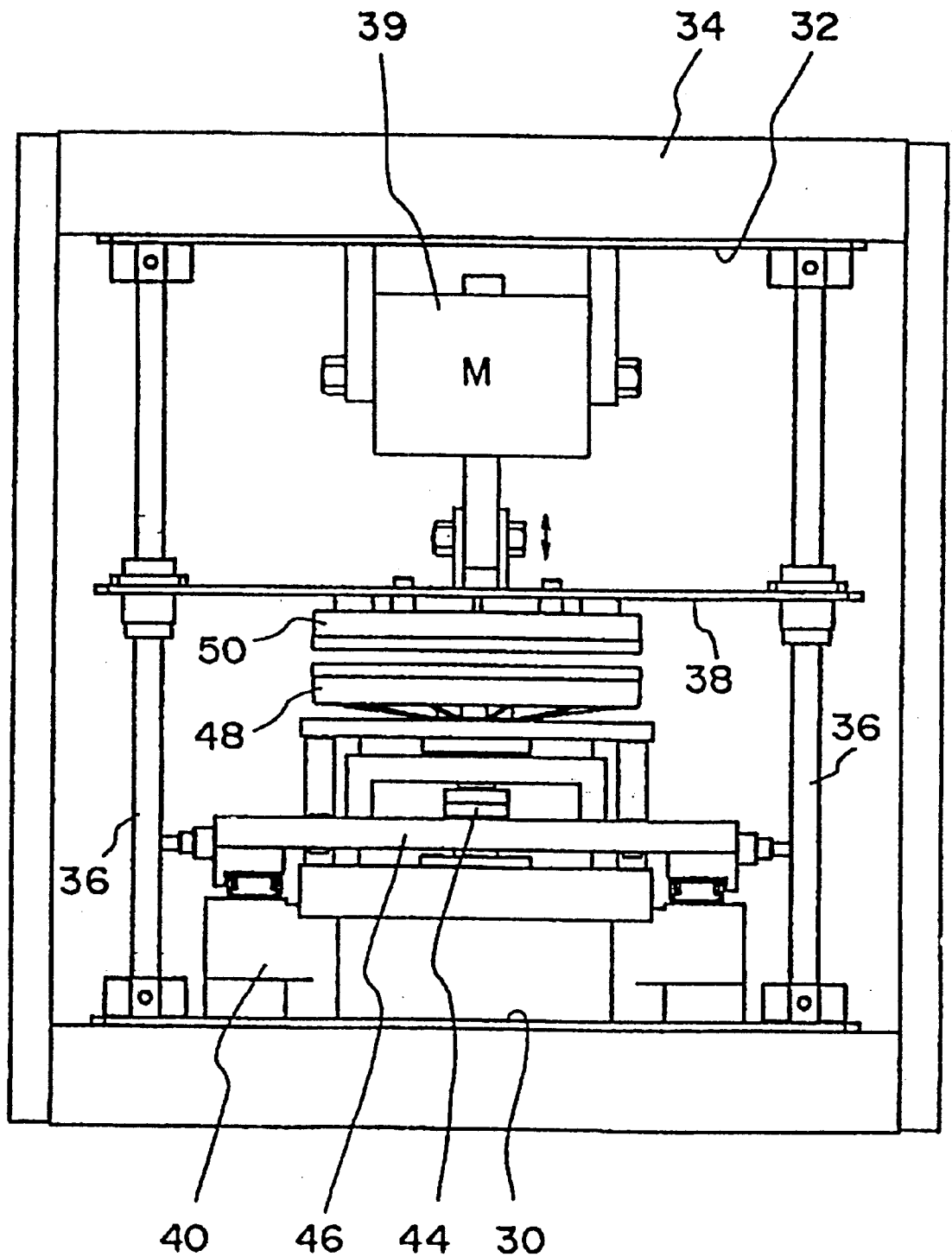
FIG. 22 is a front view of the energy extracting mechanism of FIG. 20 when a drive source is mounted therein.

FIGS. 20 to 22 depict a rotational-energy extracting mechanism of a construction more concrete than that of FIG. 18. The rotational-energy extracting mechanism shown therein includes a generally rectangular lower plate 30, a generally rectangular upper plate 32 spaced a predetermined distance from the lower plate 30 and extending parallel thereto, and two rectangular frames 34 to which the upper and lower plates 32, 30 are secured. Four vertically extending pillars 36 are secured at opposite ends thereof to respective corners of the upper plate 32 and those of the lower plate 30, while a floating table 38 is vertically movably mounted to the four vertically extending pillars 36. The floating table 38 is coupled to a drive shaft 39a of a drive source 39 such as a VCM or the like secured to the upper plate 32 and is vertically moved by a drive force of the drive source 39.

A pair of flywheels 42 are rotatably mounted on a base 40 secured to the lower plate 30. Each of the flywheels 42 is coupled on one side thereof to one end of a connecting shaft 44, the other end of which is coupled to a slider 46 slidably mounted on the base 40. A disc-shaped permanent magnet 48, disposed above the flywheels 42, is secured to an upper one of them for rotation together therewith. A disc-shaped permanent magnet 50 is secured to a lower surface of the floating table 38 so as to confront the permanent magnet 48 with the same magnetic poles opposed to each other.

Figure 23:
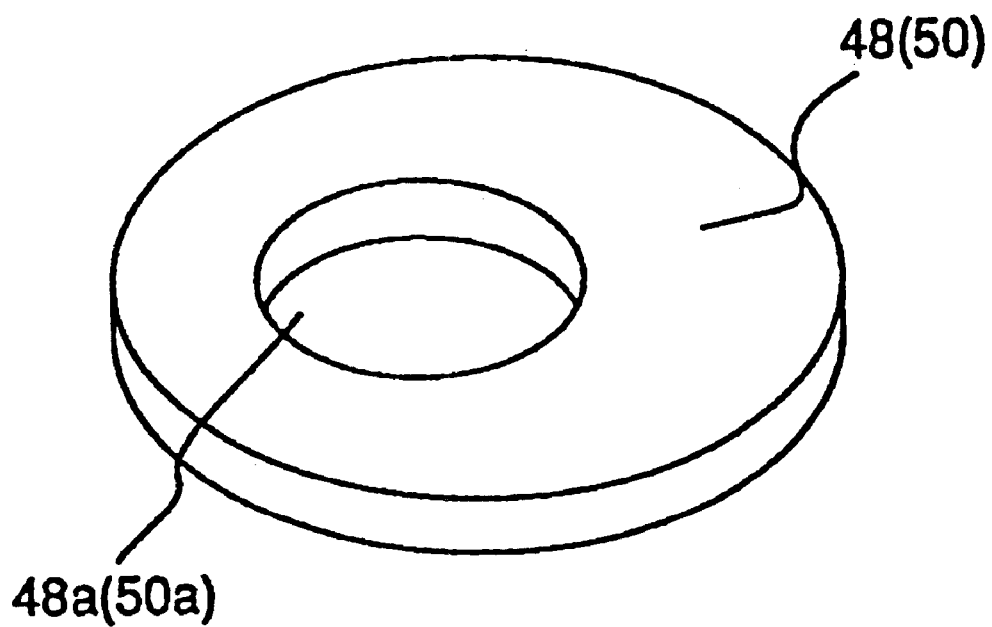
FIG. 23 is a perspective view of one of two magnets mounted in the energy extracting mechanism of FIG. 20.

As shown in FIG. 23, each of the two permanent magnets 48, 50 has a round hole 48a, 50a defined therein and having an eccentric center relative to the center thereof.

Figure 24:
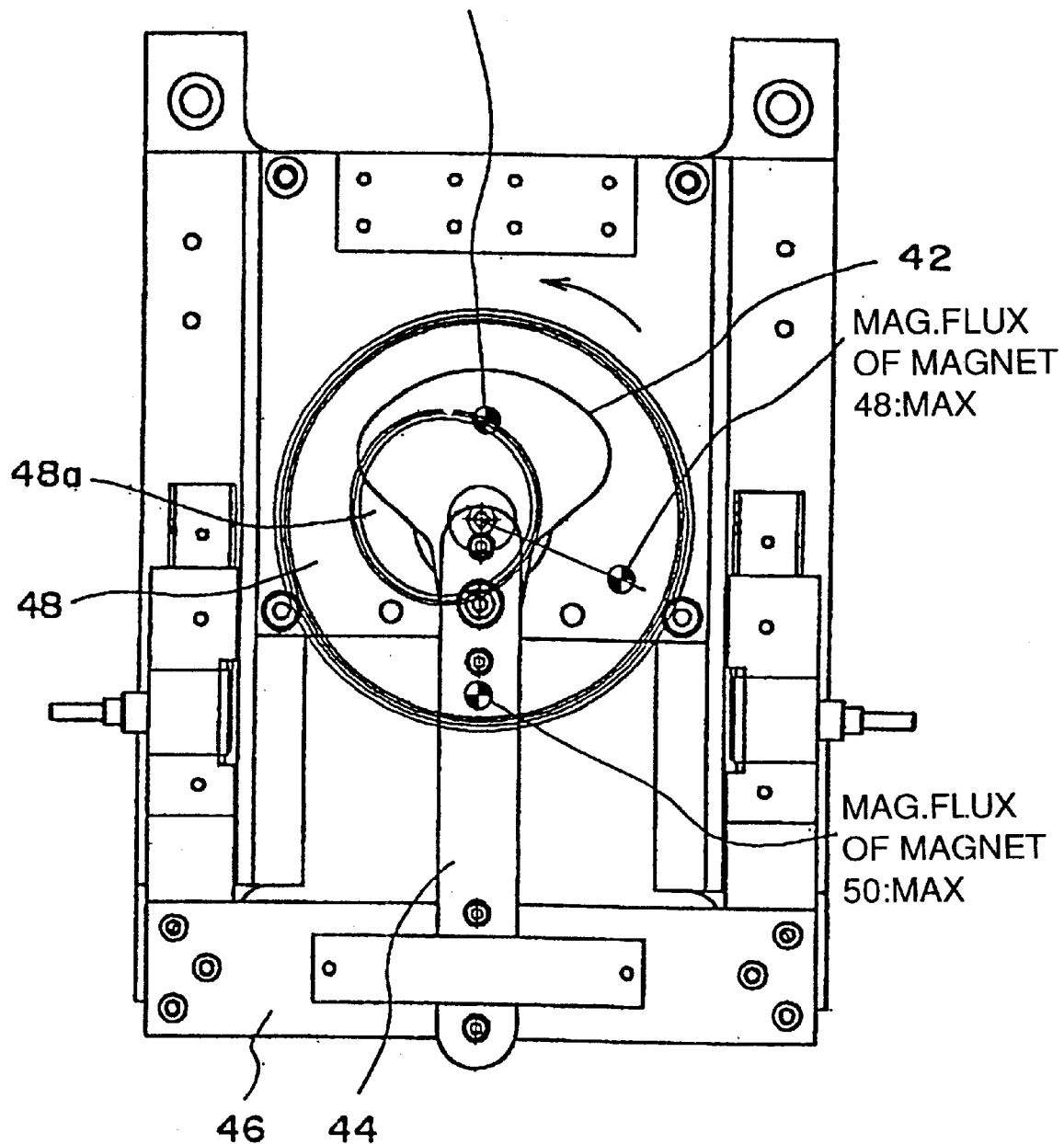
FIG. 24 is a top plan view of the main portion of the energy extracting mechanism of FIG. 20, particularly showing a positional relationship between the lower permanent magnet and flywheels secured thereto.
Figure 25:
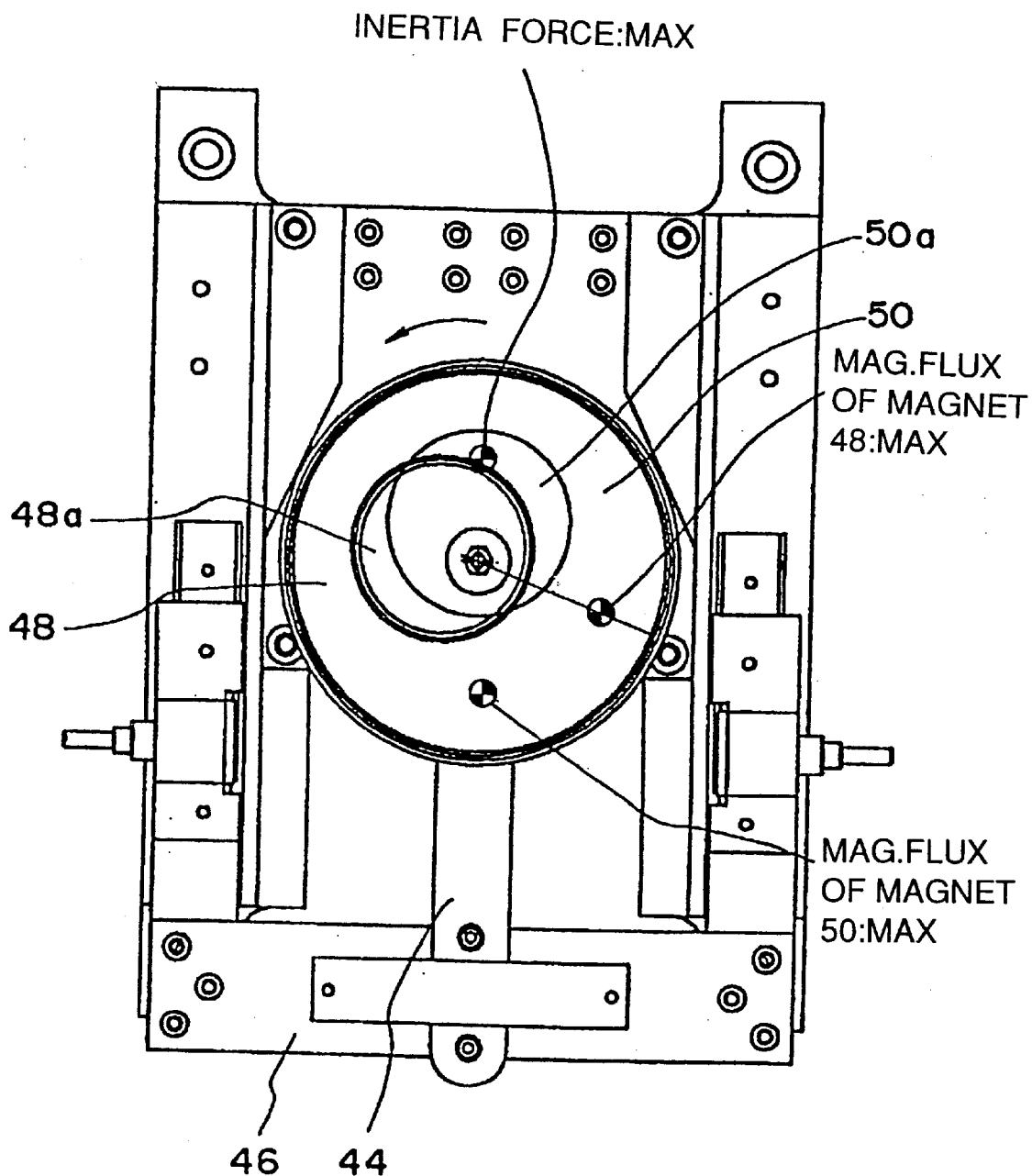
FIG. 25 is a view similar to FIG. 24, but showing a positional relationship between the two opposing permanent magnets.

In FIGS. 24 and 25, a position where the magnetic flux of the lower permanent magnet 48 is maximum, a position where that of the upper permanent magnet 50 is maximum, and a position where the inertia forces of the pair of flywheels 48 are maximum are indicated. In these figures, the upper permanent magnet 50 secured to the floating table 38 is positioned at a bottom dead point (the lowest point) closest to the lower permanent magnet 50. When the lower permanent magnet 48 is rotated 180° from this position in a direction shown by an arrow, the upper permanent magnet 50 moves upwardly and reaches a top dead point. When the lower permanent magnet 48 is further rotated about 90°, it reaches a change point where it is still rotated in the same direction by means of rotational inertia of the flywheels 42.

In the above-described construction, when the drive force of the drive source 39 is transmitted to the floating table 38 at a balanced position of the two permanent magnets 48, 50, the floating table 38 and the upper permanent magnet 50 are oscillated vertically at a predetermined frequency. Because the rotatable lower permanent magnet 48 confronts the upper permanent magnet 50 with the same magnetic poles opposed to each other, the lower permanent magnet 4 is rotated continuously by means of a force acting to return it to a place where the potential energy thereof is minimum, kinetic energy thereof, an inertia force thereof, and an inertial force of the flywheels 42. That is, a relatively small oscillating input applied to the upper permanent magnet 50 rotates the lower permanent magnet 48 at a high speed, making it possible to extract rotational energy.

Figure 26:
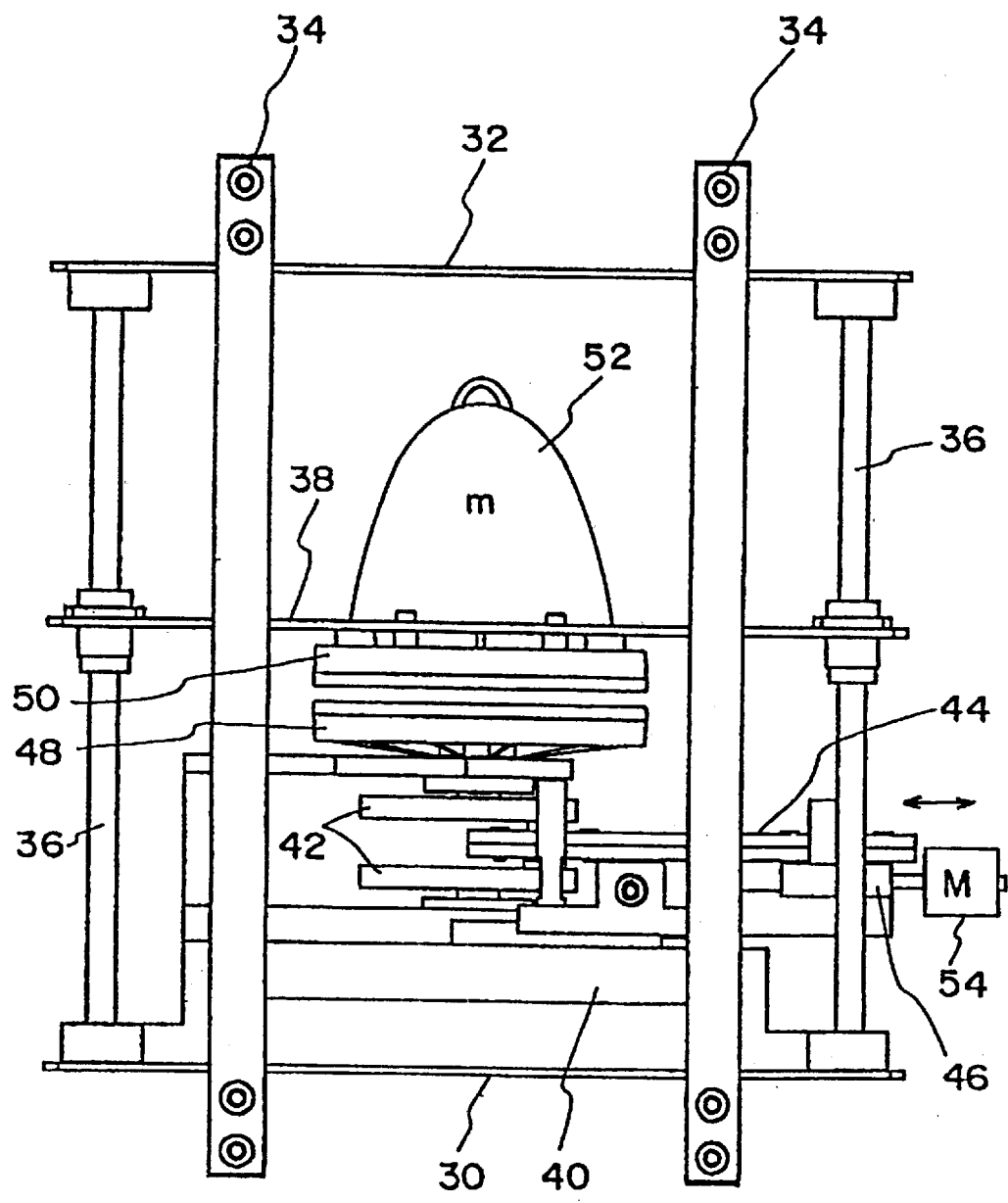
FIG. 26 is a front view of a modification of the energy extracting mechanism of FIG. 20.

FIG. 26 depicts an energy extracting mechanism including, in addition to the mechanism of FIG. 20, a weight 52 placed on the floating table 38 and a drive source 54 such as, for example, a VCM coupled to the slider 46.

In this construction, when the drive force of the drive source 54 is transmitted to the slider 46, the lower permanent magnet 48 together with the flywheels 42 is rotated via the connecting shaft 44 at a predetermined frequency. As a result, an area conversion is caused between the two permanent magnets 48, 50, and converts energy inputted by the drive source 54 into potential energy of the weight 52. This potential energy is in turn converted into a torque (rotational energy) by the two permanent magnets 48, 50 and is stored as an inertia force of the flywheels 42, which can be extracted as rotational energy.

The dynamic characteristics of the magnetic spring referred to above are explained hereinafter using a characteristic equation of a simplified fundamental model shown in FIG. 27.

Figure 27:
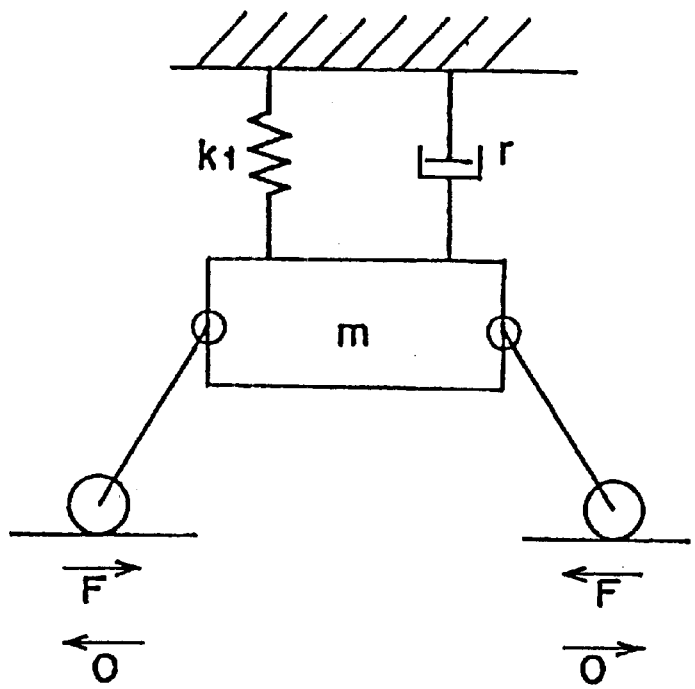
FIG. 27 is a schematic view of a fundamental model explanatory of the characteristics of the magnetic spring.

In FIG. 27, an input F is the force produced by a change in geometric dimensions caused by, for example, the area conversion of the permanent magnets. When the spring constant, the damping coefficient, and a harmonic excitation inputted to a mass m are represented by k, r, and F(t), respectively, the characteristic equation is given by:

$$m\ddot{x} + r\dot{x} - \frac{k}{x} + mg = F(t) \quad (1)$$

When the balanced position is expressed as $x_0$ and the deflection from the balanced position is expressed as y, $$-\frac{k}{x_0} + mg = 0, \; x_0 = \frac{k}{mg} \quad (2)$$

$$x = x_0 + y$$

$$\dot{x} = \dot{y}$$

$$\ddot{x} = \ddot{y}$$

$$\frac{k}{x} = \frac{k}{x_0 + y} = \frac{k}{x_0\left(1 + \frac{y}{x_0}\right)} \approx \frac{k}{x_0}\left(1 - \frac{y}{x_0}\right) \; [\because y \ll x_0]$$

$$= \frac{k}{x_0} - \frac{k}{x_0^2}y$$

$$m\ddot{x} + r\dot{x} - \frac{k}{x} + mg = m\ddot{y} + r\dot{y} - \frac{k}{x_0 + y} + mg$$

$$= m\ddot{y} + r\dot{y} - \frac{k}{x_0} + \frac{k}{x_0^2}y + \frac{k}{x_0}$$

$$= m\ddot{y} + r\dot{y} + \frac{k}{x_0^2}y$$

If $k/x_0^2 = k'$, $$m\ddot{y} + r\dot{y} + k'y = F(t)$$

If the harmonic excitation $F(t) = Fe^{i\omega t}$ and $y = xe^{i\omega t}$, $$\dot{y} = i\omega x e^{i\omega t}$$

$$\ddot{y} = i^2\omega^2 x e^{i\omega t}$$

$$-m\omega^2 x e^{i\omega t} + ri\omega x e^{i\omega t} + k' x e^{i\omega t} = Fe^{i\omega t}$$

$$(-m\omega^2 x + ri\omega x + k' x)e^{i\omega t} = Fe^{i\omega t}$$

$$x(k' - m\omega^2 + ri\omega) = F$$

$$x = \frac{F}{k' - m\omega^2 + ri\omega}$$

$$= \frac{F(k' - m\omega^2 - ri\omega)}{(k' - m\omega^2 + ri\omega)(k' - m\omega^2 - ri\omega)}$$

$$= \frac{F}{\sqrt{(k' - m\omega^2)^2 + (r\omega)^2}}\left[\frac{k' - m\omega^2}{\sqrt{(k' - m\omega^2)^2 + (r\omega)^2}} - ir\frac{\omega}{\sqrt{(k' - m\omega^2)^2 + (r\omega)^2}}\right]$$

$$= \frac{F}{\sqrt{(k' - m\omega^2)^2 + (r\omega)^2}}(\cos\phi - i\sin\phi)$$

$$= \frac{F}{\sqrt{(k' - m\omega^2)^2 + (r\omega)^2}}e^{-i\phi}$$

$$y = xe^{i\omega t} = \frac{F}{\sqrt{(k' - m\omega^2)^2 + (r\omega)^2}}e^{i(\omega t - \phi)}$$

$$= \frac{F}{\sqrt{k'^2\left[1 - \left(\frac{\omega}{\omega_0}\right)^2\right]^2 + \left(2\rho\frac{\omega}{\omega_0}\right)^2}}e^{i(\omega t - \phi)}$$

where φ represent the phase angle.

$$\rho = r/2\sqrt{mk'}$$

$$\omega_o^2 = \frac{k'}{m} = \frac{k}{mx_0^2} = \frac{k}{m}\left(\frac{mg}{k}\right)^2 = \frac{m}{k}g^2$$

Accordingly, the natural frequency (resonant frequency) $\omega_0$ is given by:

$$\omega_o \propto \sqrt{\frac{m}{k}}$$

The equation (2) can be expresses as follows.

$$\frac{k}{x} = \frac{k}{x_0 + y} = \frac{k}{x_0\left(1 + \frac{y}{x_0}\right)} = \frac{k}{x_0}\left(\frac{1}{1 + \frac{y}{x_0}}\right)$$

$$= \frac{k}{x_0}\left\{1 - \frac{y}{x_0} + \left(\frac{y}{x_0}\right)^2 - \left(\frac{y}{x_0}\right)^3 + \cdots (-1)^n\left(\frac{y}{x_0}\right)^n + \cdots\right\}$$

$$m\ddot{x} + r\dot{x} - \frac{k}{x} + mg = m\ddot{y} + r\dot{y} + \frac{k}{x_0} - \frac{k}{x_0}\left\{1 - \frac{y}{x_0} + \left(\frac{y}{x_0}\right)^2 - \left(\frac{y}{x_0}\right)^3 + \cdots\right\}$$

$$= m\ddot{y} + r\dot{y} + \frac{k}{x_0}\left\{\frac{y}{x_0} - \left(\frac{y}{x_0}\right)^2 + \left(\frac{y}{x_0}\right)^3 - \cdots\right\}$$

Let y be x and when the equation having up to a term of the third degree is considered, $$m\ddot{x} + r\dot{x} + \frac{k}{x_0^2}x - \frac{k}{x_0^3}x^2 + \frac{k}{x_0^4}x^3 = F(t) \quad (3)$$

$$m\ddot{x} + r\dot{x} + ax - bx^2 + cx^3 = F(t)$$

$$a = \frac{k}{x_0^2} = \left(\frac{mg}{k}\right)^2 k = \frac{(mg)^2}{k}$$

$$b = \frac{k}{x_0^3} = \left(\frac{mg}{k}\right)^3 k = \frac{(mg)^3}{k^2}$$

$$c = \frac{k}{x_0^4} = \left(\frac{mg}{k}\right)^4 k = \frac{(mg)^4}{k^3}$$

The equation (3) has a damping term of $-bx^2$ in the term of the second degree. When the equation (3) is further simplified, $$m\ddot{x} + r\dot{x} + ax - bx^2 = F(t)$$

When $x = x_0 \cos \omega t$, $$x^2 = x_0^2 \cos^2 \omega t = x_0^2(1 - \sin^2 \omega t)$$

$$= x_0^2\left(1 - \frac{1 - \cos 2\omega t}{2}\right) = x_0^2\left(\frac{1 + \cos 2\omega t}{2}\right)$$

$$\approx \frac{x_0^2}{2}$$

$$m\ddot{x} + r\dot{x} + ax - b\frac{x_0^2}{2} = F(t)$$

$$m\ddot{x} + r\dot{x} + ax = F(t) + \frac{b}{2}x_0^2$$

In a vibration region with a small amplitude, a constant repulsive force $((b/2)x_0^2)$ is continuously applied to a periodic external force to attenuate it.

Figure 28:
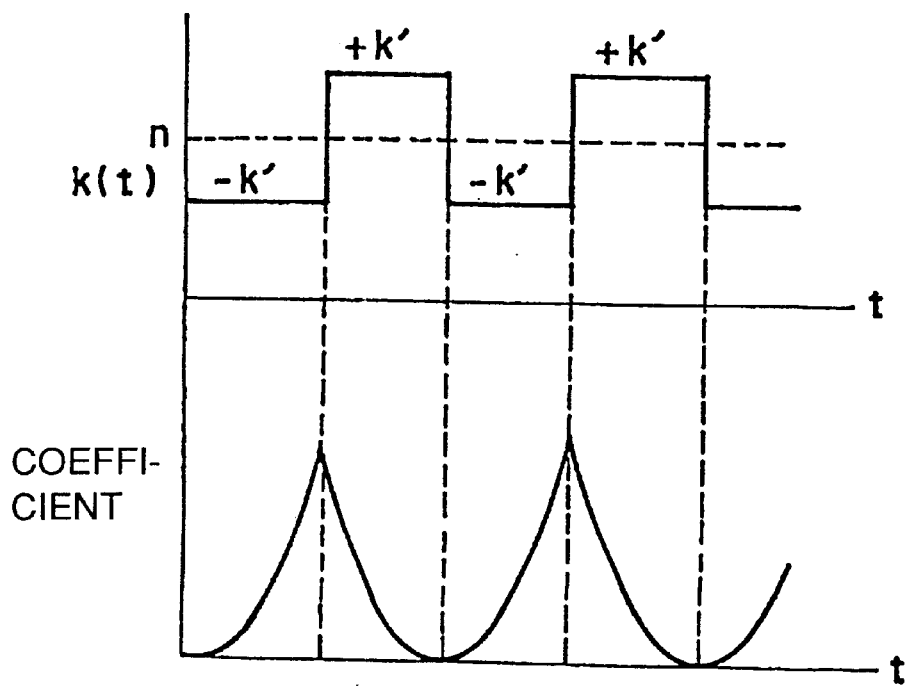
FIG. 28 is a graph showing a spring constant and a coefficient both changing with time in the magnetic spring structure according to the present invention.

In the equation (1), when the geometric dimensions between the opposing permanent magnets are changed by an internal kinetic mechanism (mechanism for moving the permanent magnets within a repulsion system) or by an external force, the spring constant k is a square wave k(t) changing with time, as shown in FIG. 28, and takes a value of +k' or −k' alternately in one half of a period of $T = 2\pi/\omega$. Accordingly, the equation (1) can be expressed as follows.

$$m\ddot{x} + r\dot{x} + mg - \frac{k(t)}{x} = F(t) \quad (4)$$

(i) When $0 < t < \pi/\omega$, $$m\ddot{x} + r\dot{x} + mg - \frac{n - k'}{x} = F(t)$$

(ii) When $\pi/\omega \leq t < 2\pi/\omega$, $$m\ddot{x} + r\dot{x} + mg - \frac{n + k'}{x} = F(t)$$

When $0 < t < \pi/\omega$ and when the balanced position is represented by $x_0$ and the deflection from the balanced position is represented by $y_1$, $$-\frac{n - k'}{x_0} + mg = 0, \quad x_0 = \frac{n - k'}{mg}$$

$$x = x_0 + y_1$$

$$\dot{x} = \dot{y}_1$$

$$\ddot{x} = \ddot{y}_1$$

$$\frac{n - k'}{x} = \frac{n - k'}{x_0 + y_1} = \frac{n - k'}{x_0\left(1 + \frac{y_1}{x_0}\right)} \approx \frac{n - k'}{x_0}\left(1 - \frac{y_1}{x_0}\right) \quad [\because y_1 \ll x_0]$$

$$= \frac{n - k'}{x_0} - \frac{n - k'}{x_0^2}y_1$$

$$m\ddot{x} + r\dot{x} - \frac{n - k'}{x} + mg = m\ddot{y}_1 + r\dot{y}_1 - \frac{n - k'}{x_0 + y_1} + mg$$

$$= m\ddot{y}_1 + r\dot{y}_1 - \frac{n - k'}{x_0} + \frac{n - k'}{x_0^2}y_1 + \frac{n - k'}{x_0}$$

$$= m\ddot{y}_1 + r\dot{y}_1 + \frac{n - k'}{x_0^2}y_1$$

When $(n - k')/x_0^2 = k_1'$, $$m\ddot{y}_1 + r\dot{y}_1 + k_1'y_1 = F(t)$$

When the harmonic excitation $F(t) = Fe^{i\omega t}$ and $y_1 = xe^{i\omega t}$, $$\dot{y}_1 = i\omega x e^{i\omega t}$$

$$\ddot{y}_1 = i^2\omega^2 x e^{i\omega t}$$

$$-m\omega^2 x e^{i\omega t} + ri\omega x e^{i\omega t} + k'_1 x e^{i\omega t} = F e^{i\omega t}$$

$$(-m\omega^2 x + ri\omega x + k'_1 x)e^{i\omega t} = F e^{i\omega t}$$

$$x(k'_1 - m\omega^2 + ri\omega) = F$$

$$x = \frac{F}{k'_1 - m\omega^2 + ri\omega}$$

$$= \frac{F(k'_1 - m\omega^2 - ri\omega)}{(k'_1 - m\omega^2 + ri\omega)(k'_1 - m\omega^2 - ri\omega)}$$

$$= \frac{F}{\sqrt{(k'_1 - m\omega^2)^2 + (r\omega)^2}}\left[\frac{k'_1 - m\omega^2}{\sqrt{(k'_1 - m\omega^2)^2 + (r\omega)^2}} - ir\frac{\omega}{\sqrt{(k'_1 - m\omega^2)^2 + (r\omega)^2}}\right]$$

$$= \frac{F}{\sqrt{(k'_1 - m\omega^2)^2 + (r\omega)^2}}(\cos\phi - i\sin\phi)$$

$$= \frac{F}{\sqrt{(k'_1 - m\omega^2)^2 + (r\omega)^2}}e^{-i\phi}$$

$$y_1 = xe^{i\omega t} = \frac{F}{\sqrt{(k'_1 - m\omega^2)^2 + (r\omega)^2}}e^{i(\omega t - \phi)}$$

$$= \frac{F}{\sqrt{k'^2_1\left[1 - \left(\frac{\omega}{\omega_0}\right)^2\right]^2 + \left(2\rho\frac{\omega}{\omega_0}\right)^2}}e^{i(\omega t - \phi)}$$

Here, $\phi$ indicates the phase angle.

$$\rho = r/2\sqrt{mk'_1}$$

$$\omega_o^2 = \frac{k'_1}{m} = \frac{n-k'}{mx_0^2} = \frac{n-k'}{m}\left(\frac{mg}{n-k'}\right)^2 = \frac{m}{n-k'}g^2$$

Accordingly, the resonant frequency $\omega_0$ is given by:

$$\omega_o \propto \sqrt{\frac{m}{n-k'}}$$

Similarly, when $\pi/\omega \leq t < 2\pi/\omega$, $$y_2 = \frac{F}{\sqrt{k'^2_2\left[1 - \left(\frac{\omega}{\omega_o}\right)^2\right]^2 + \left(2\rho\frac{\omega}{\omega_o}\right)^2}}e^{i(\omega t - \phi)}$$

$$k'_2 = \frac{n-k'}{x_1^2} \qquad \rho = \frac{r}{2\sqrt{m\frac{n+k'}{x_1^2}}}$$

Hence, when $y_1 > y_2$, it diverges.

In general, a self-excited vibration system can be replaced with a spring-mass system having negative damping characteristics, and energy of vibration is introduced thereinto from outside during vibration. The actual vibration, however, loses energy because air resistance or various resistances act on the mass point.

However, if the energy of vibration is introduced as an external force into the magnetic spring having negative damping characteristics, it diverges in the case of $y_1 > y_2$, as described above. If it continues diverging, the amplitude is gradually increased to thereby destroy the system. Otherwise, positive damping is caused to act on the system by adding a damping term, which increases with deflection, to the above characteristic equation. In this case, when the positive damping is balanced with the negative damping, steady-state vibration occurs in the system. In other words, as is the case with the spring constant k(t), the damping coefficient is variable and, hence, the equation (1) can be rewritten as follows.

$$m\ddot{x} + r(x)\dot{x} + mg - \frac{k(t)}{x} = F(t) \tag{5}$$

The vibration system having the magnetic spring of the present invention includes an energy conversion system inducing continuous oscillation or diverging vibration. Adding a positive damping term to the above characteristic equation results in the following equation.

$$m\ddot{x} + (r_2 x^2 - r)\dot{x} + mg - \frac{k(t)}{x} = F(t) \tag{6}$$

In this characteristic equation, when $r_2 \neq 0$, three terms on the left side become greater with x, and the term of spring acts as a positive damping term. Accordingly, in the internal exciting characteristics by the permanent magnets, a small deflection causes negative damping, while an increase in deflection results in positive damping, and the vibration become steady at an amplitude where the positive damping and the negative damping are balanced.

In the case where the magnitude of at least one of the mass, damping coefficient, and spring constant in a vibration system changes with time, the vibration caused thereby is referred to as coefficient exciting vibration. Each of the equations (7), (8), and (9) indicates the coefficient exciting vibration in which an exciting source itself vibrates and generates vibration by converting non-vibrating energy within the system to vibratory excitation.

Because supply energy is generally converted from part of dynamic energy, when the dynamic energy has an upper limit, the supply energy is limited, and the amplitude is restrained when this energy becomes equal to energy to be consumed. The potential energy by the permanent magnets is independent of the dynamic energy within the system. The difference between the potential energy from the permanent magnets and the energy to be consumed can be increased by increasing the maximum energy product per unit mass of the permanent magnets. Because of this, the amount of energy converted to vibration energy in one cycle can be increased by making, the supply energy produced by negative damping greater than the energy consumed by the damping in the particular cycle.

As described above, it is possible to freely control the damping coefficient r and the spring constant (coefficient) k in the equation (1). In the schematic diagram of FIG. 1, for example, the amplitude can be attenuated by maximizing the opposing area of the permanent magnets 2 and 4 when the permanent magnet 4 is positioned at its lower end. This feature is applicable to a magnetic brake, dynamic damper or the like. On the other hand, the repulsive force can be increased by maximizing the opposing area when the permanent magnet 4 is moved from its lower end towards it upper end. This feature is applicable to a generator, amplifier or the like.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A magnet-spring apparatus comprising:
   only one first movable permanent magnet having a magnetic pole of a first polarity and a magnetic pole of a second polarity, operable to receive an input;
   only one second movable permanent magnet, having a magnetic pole of the first polarity and a magnetic pole of the second polarity, spaced from said first permanent magnet and oriented such that the magnetic pole of the first polarity of said second permanent magnet is opposed to the magnetic pole of the first polarity of said first permanent magnet so as to exhibit a magnetic field between said first permanent magnet and said second permanent magnet; and
   an overlap area changing device operable to change an overlapping area of said first and second permanent magnets so as to effect a change in magnetic energy of the magnetic field between said first and second permanent magnets;
   wherein said second permanent magnet is operable to produce a reciprocating movement output in response to both the input received by said first permanent magnet and the change in magnetic energy of the magnetic field between said first and second permanent magnets.

2. A magnet-spring apparatus as claimed in claim 1, wherein said first permanent magnet is operable to be rotated by the input and said second permanent magnet is operable to slide vertically in response to both the input received by said first permanent magnet and the change in magnetic energy of the magnetic field between said first permanent magnet and said second permanent magnet.

3. A magnet-spring apparatus comprising:
   only one first movable permanent magnet having a magnetic pole of a first polarity and a magnetic pole of a second polarity, operable to receive an input;
   only one second movable permanent magnet having a magnetic pole of the first polarity and a magnetic pole of the second polarity spaced from said first permanent magnet and oriented such that the magnetic pole of the first polarity of said second permanent magnet is opposed to the magnetic pole of the first polarity of said first permanent magnet so as to exhibit a magnetic field between said first permanent magnet and said second permanent magnet; and
   an overlap area changing device operable to change an overlapping area of said first and second permanent magnets so as to effect a change in magnetic energy of the magnetic field between said first and second permanent magnets;
   wherein said second permanent magnet is operable to produce an output in response to both the input received by said first permanent magnet and the change in magnetic energy of the magnetic field between said first and second permanent magnets;
   a driving device operable to apply a load to said first permanent magnet, so as to impart a potential energy onto said second permanent magnet, and oscillate said first permanent magnet at a balanced position with respect to said second permanent magnet; and
   a flywheel coupled to said second permanent magnet;
   wherein each of said first and second permanent magnets is disc-shaped and has an eccentric round hole defined therein, and said second permanent magnet is operable to rotate continuously via a force acting on said second permanent magnet tending to return said second permanent magnet to a position where a potential energy of said second permanent magnet is minimum, via a kinetic energy of the magnetic field between said first permanent magnet and said second permanent magnet, and via an inertial moment of said flywheel.

4. A magnet-spring apparatus as claimed in claim 3, wherein said first permanent magnet is operable to be slid by the input.

* * * * *